United States Patent
Yamashita et al.

(10) Patent No.: US 8,714,764 B2
(45) Date of Patent: May 6, 2014

(54) LIGHT EMITTING MODULE, LIGHT EMITTING MODULE UNIT, AND BACKLIGHT SYSTEM

(75) Inventors: Atsushi Yamashita, Osaka (JP); Hiroyuki Nabesawa, Osaka (JP); Ken Sumitani, Osaka (JP); Manabu Yumoto, Osaka (JP); Manabu Onozaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 13/202,368

(22) PCT Filed: Feb. 25, 2010

(86) PCT No.: PCT/JP2010/052922
§ 371 (c)(1),
(2), (4) Date: Sep. 6, 2011

(87) PCT Pub. No.: WO2010/101062
PCT Pub. Date: Sep. 10, 2010

(65) Prior Publication Data
US 2011/0310590 A1   Dec. 22, 2011

(30) Foreign Application Priority Data
Mar. 5, 2009 (JP) .................................. 2009-052263

(51) Int. Cl.
*G09F 13/04* (2006.01)
*G09F 13/08* (2006.01)
*F21S 4/00* (2006.01)
*F21V 21/00* (2006.01)

(52) U.S. Cl.
USPC ................ 362/97.3; 362/249.02; 362/249.06; 362/97.1; 362/97.2

(58) Field of Classification Search
USPC ........ 362/97.1–97.3, 249.02, 249.06; 439/69, 439/72; 361/728–818; 307/157
See application file for complete search history.

(56) References Cited

U.S. PATENT DOCUMENTS

| 4,367,417 A | * | 1/1983 | Casasanta | 307/147 |
| 4,500,796 A | * | 2/1985 | Quin | 307/147 |

(Continued)

FOREIGN PATENT DOCUMENTS

| JP | 2004-063237 | 2/2004 |
| JP | 2005-316337 | 11/2005 |
| JP | 2005-353498 | 12/2005 |

OTHER PUBLICATIONS

Merriam-Webster Dictionary "Identical" definition, accessed Feb. 20, 2013.*

(Continued)

Primary Examiner — Peggy Neils
Assistant Examiner — Erin Kryukova
(74) Attorney, Agent, or Firm — Nixon & Vanderhye P.C.

(57) ABSTRACT

A light emitting module board which is compatible with a plurality of screen sizes and is used for a backlight apparatus of a liquid crystal display panel is provided. A light emitting module includes a first connector 15 and a second connector 16, each including a plurality of cathode terminals and at least one anode terminal, at each end of the board, and can be connected to another one to each other through the connectors in multi-level. A cathode wiring 14 for supplying a cathode control signal includes first cathode wirings which connect the cathode terminals of the first connector and light emitting bodies to supply a control signal to the light emitting bodies in the light emitting module, and second cathode wirings which connect the cathode terminals of the first and second connectors to supply a control signal to the light emitting bodies on a downstream light emitting module.

14 Claims, 25 Drawing Sheets

(56) References Cited

U.S. PATENT DOCUMENTS

| | | | |
|---|---|---|---|
| 4,794,373 A * | 12/1988 | Harrison | 340/286.01 |
| 5,453,916 A * | 9/1995 | Tennis et al. | 362/152 |
| 5,559,681 A * | 9/1996 | Duarte | 362/231 |
| 6,183,104 B1 * | 2/2001 | Ferrara | 362/145 |
| 6,659,622 B2 | 12/2003 | Katogi et al. | 362/219 |
| 6,798,150 B2 * | 9/2004 | Moon | 315/169.3 |
| 6,948,972 B2 * | 9/2005 | Laukhuf | 439/490 |
| 6,969,179 B2 * | 11/2005 | Sloan et al. | 362/219 |
| 7,067,992 B2 * | 6/2006 | Leong et al. | 315/291 |
| 7,744,233 B2 * | 6/2010 | Moriyasu et al. | 362/97.3 |
| 8,197,079 B2 * | 6/2012 | Ruud et al. | 362/85 |
| 8,201,959 B2 * | 6/2012 | Kim | 362/97.3 |
| 8,282,228 B2 * | 10/2012 | Park et al. | 362/97.2 |
| 8,289,467 B2 * | 10/2012 | Kuwajima et al. | 349/58 |
| 8,310,437 B2 * | 11/2012 | Maruyama et al. | 345/102 |
| 2005/0073495 A1 | 4/2005 | Harbers et al. | |
| 2009/0161039 A1 * | 6/2009 | Toyama et al. | 349/68 |
| 2009/0174840 A1 * | 7/2009 | Lee et al. | 349/67 |
| 2012/0153871 A1 * | 6/2012 | Zeutzius et al. | 315/312 |
| 2012/0293535 A1 * | 11/2012 | Nozawa | 345/589 |

OTHER PUBLICATIONS

International Search Report for PCT/JP2010/052922, mailed May 18, 2010.

* cited by examiner

LED mount pitch: 50mm

| Panel size | Panel width | The number of module boards per row | | | | | | The number of LEDs per row | Length of LED column | The required number of rows of light emitting module units | Length of LED in a vertical direction |
|---|---|---|---|---|---|---|---|---|---|---|---|
| | | Board M01 8 | Board M02 6 | Board M03 5 | Adjusting Board M04 4 | Adjusting Board M05 3 | Total | | | | |
| 13 inches | 287 mm | 0 | 1 | 0 | 0 | 0 | 1 | 6 | 250 mm | 3 | 100 |
| 17 inches | 375 mm | 1 | 0 | 0 | 0 | 0 | 1 | 8 | 350 mm | 4 | 150 |
| 20 inches | 442 mm | 1 | 0 | 0 | 0 | 0 | 1 | 8 | 350 mm | 5 | 200 |
| 26 inches | 575 mm | 0 | 1 | 1 | 0 | 0 | 2 | 11 | 500 mm | 6 | 250 |
| 32 inches | 707 mm | 1 | 1 | 0 | 0 | 0 | 2 | 14 | 650 mm | 7 | 300 |
| 37 inches | 818 mm | 2 | 0 | 0 | 0 | 0 | 2 | 16 | 750 mm | 9 | 400 |
| 40 inches | 885 mm | 1 | 0 | 2 | 0 | 0 | 3 | 18 | 850 mm | 9 | 400 |
| 42 inches | 929 mm | 2 | 1 | 0 | 0 | 0 | 3 | 19 | 900 mm | 10 | 450 |
| 46 inches | 1018 mm | 2 | 0 | 1 | 0 | 0 | 3 | 21 | 1000 mm | 11 | 500 |
| 52 inches | 1150 mm | 2 | 0 | 1 | 1 | 0 | 4 | 24 | 1150 mm | 12 | 550 |
| 60 inches | 1328 mm | 2 | 1 | 1 | 0 | 0 | 4 | 27 | 1300 mm | 14 | 650 |
| 65 inches | 1438 mm | 1 | 2 | 1 | 1 | 0 | 5 | 29 | 1400 mm | 15 | 700 |
| 80 inches | 1771 mm | 2 | 2 | 1 | 0 | 1 | 6 | 36 | 1750 mm | 18 | 850 |

Fig. 12

Board (Front)

Board (Back)

AA' Sectional view

Connector on the cathode side

Connector on the anode side

Fig. 23A  Board M06 (The number of LEDs: 8)
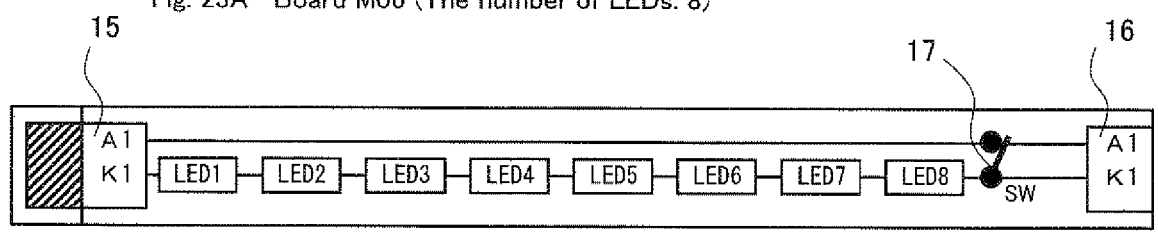
Fig. 23B  Board M07 (The number of LEDs: 6)
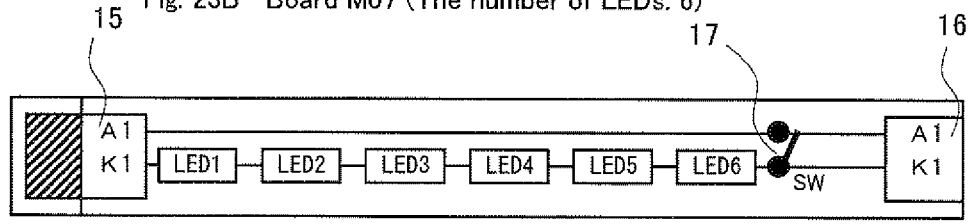
Fig. 23C  Board M08 (The number of LEDs: 5)
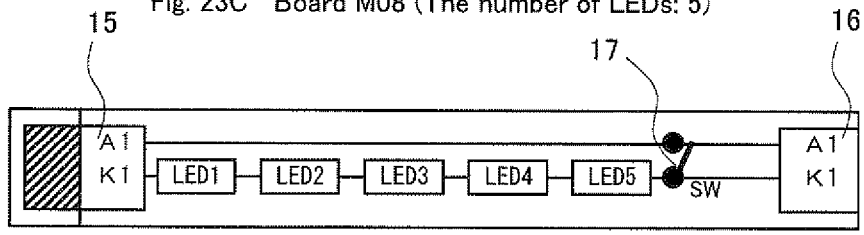

Fig. 24A  Board M09 (The number of LEDs: 4)
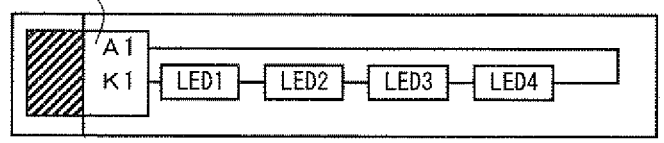
Fig. 24B  Board M10 (The number of LEDs: 3)
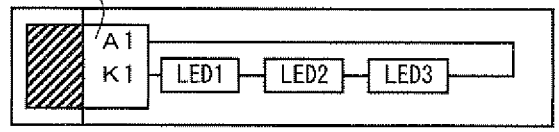

LED mount pitch: 50mm

| Panel size | Panel width | The number of module boards per row | | | | | The number of LEDs per row | Length of LED column | The required number of rows of light emitting module units | Length of LED in a vertical direction |
|---|---|---|---|---|---|---|---|---|---|---|
| | | Board M06 8 | Board M07 6 | Board M08 5 | Adjusting Board M09 4 | Adjusting Board M10 3 | Total | | | |
| 13 inches | 287 mm | 0 | 1 | 0 | 0 | 0 | 1 | 6 | 250 mm | 3 | 100 |
| 17 inches | 375 mm | 1 | 0 | 0 | 0 | 0 | 1 | 8 | 350 mm | 4 | 150 |
| 20 inches | 442 mm | 1 | 0 | 0 | 0 | 0 | 1 | 8 | 350 mm | 5 | 200 |
| 26 inches | 575 mm | 1 | 1 | 0 | 0 | 1 | 2 | 11 | 500 mm | 6 | 250 |
| 32 inches | 707 mm | 2 | 0 | 0 | 0 | 0 | 2 | 14 | 650 mm | 7 | 300 |
| 37 inches | 818 mm | 0 | 3 | 0 | 0 | 0 | 3 | 16 | 750 mm | 9 | 400 |
| 40 inches | 885 mm | 2 | 0 | 0 | 0 | 1 | 3 | 18 | 850 mm | 9 | 400 |
| 42 inches | 929 mm | 0 | 3 | 0 | 0 | 0 | 3 | 19 | 900 mm | 10 | 450 |
| 46 inches | 1018 mm | 3 | 0 | 0 | 0 | 0 | 3 | 21 | 1000 mm | 11 | 500 |
| 52 inches | 1150 mm | 3 | 0 | 0 | 0 | 0 | 3 | 24 | 1150 mm | 12 | 550 |
| 60 inches | 1328 mm | 1 | 3 | 0 | 0 | 1 | 4 | 27 | 1300 mm | 14 | 650 |
| 65 inches | 1438 mm | 3 | 0 | 0 | 0 | 1 | 4 | 29 | 1400 mm | 15 | 700 |
| 80 inches | 1771 mm | 0 | 6 | 0 | 0 | 0 | 6 | 36 | 1750 mm | 18 | 850 |

Fig. 25

LIGHT EMITTING MODULE, LIGHT EMITTING MODULE UNIT, AND BACKLIGHT SYSTEM

CROSS-REFERENCE TO RELATED APPLICATIONS

This application is the U.S. national phase filing under 35 U.S.C. §371 of International Application No. PCT/JP2010/052922 filed on Feb. 25, 2010, which designed the U.S. and which claims priority to Japanese Patent Application No. 2009-052263 filed on Mar. 5, 2009, the entire contents of each of which are hereby incorporated by reference.

TECHNICAL FIELD

The present invention relates to a backlight apparatus for a transmission display apparatus and, in particular, to a backlight apparatus that has a module board common to screen sizes to reduce the number of types of constituent elements for a mount board.

BACKGROUND ART

At present, a thin display panel centered on a liquid crystal panel rapidly spreads, and manufacturers and distributors actively variedly compete with each other in terms of functions, quality, costs, and the like.

As one method of differentiating products between the manufacturers and the distributors, a screen size may be variously changed.

In a present mainstream liquid crystal display apparatus, a CCFL (Cold Cathode Fluorescent Lamp) is arranged at a corner of a screen and used as a light source. However, in consideration of environment such as power-saving products or mercury-free products, the present liquid crystal display apparatus has gradually shifted to a liquid crystal display apparatus using an LED (Light Emitting Diode) as a light source. However, a large liquid crystal display apparatus, for example, a liquid crystal television cannot be implemented that is equivalent to conventional display apparatus in terms of cost and performance such as short brightness of each LED or uneven color and brightness. In consideration of the circumstances, backlight systems using various schemes achieved by LED light sources are developed. A configuration is proposed in which, without arranging LEDs at an end of a screen, unlike in the conventional display apparatus, the number of LEDs is increased and the LEDs are arranged immediately below a screen to adjust uneven brightness and color.

As an example in which LEDs are arranged immediately below a screen, in Patent Document 1, the following backlight system is disclosed. That is, a plurality of red LEDs, green LEDs, and blue LEDs are arranged on a plane parallel to a board, the LEDs are arranged in a longitudinal direction of the board in a predetermined order to configure a horizontally long rectangular light emitting block body, and configurations each having the three light emitting block bodies arranged in a row are parallel arranged in a plurality of steps.

PRIOR ART DOCUMENT

Patent Document

Patent Document 1: JP-A-2005-316337
Patent Document 2: JP-A-2005-115372

SUMMARY OF THE INVENTION

Problems to be Solved by the Invention

A mount board for a backlight is formed for each required specific screen size and arranged in a backlight system to make it possible to extend the variation in screen size. However, different mount boards are required depending on desired sizes. For this reason, expensive molds for boards need to be prepared depending on screen sizes, and a mold cost is increased in proportion to an increase of a variation in screen size, which leads to high cost of production.

Patent Document 1 does not specially describe a configuration of a backlight board prepared for each screen size, and also does not describe a problem occurring in design of the backlight board in consideration of a variation in screen size. The present invention was made in consideration of the above problem, and an object thereof is to provide a light emitting module that can be used in a backlight board for a plurality of screen sizes in a backlight system necessary for, in particular, a transmission display panel such as a liquid crystal display by sharing part of the mount board to prepare various screen sizes.

Means for Solving the Problem

A light emitting module according to the present invention has a first characteristic feature in which, on a board, an anode control signal wiring group, a cathode control signal wiring group, and a plurality of light emitting bodies arranged in a longitudinal direction of the board are formed, both ends of the board independently have a first connector and a second connector each configured by a plurality of cathode terminals and at least one anode terminal, and the second connector of an upstream module and the first connector of a downstream module are connected to make it possible to realize a multi-level connection, wherein the anode control signal wiring group includes first anode wirings one ends of which are connected commonly to one of the anode terminals of the first connector and the other ends of which are connected to one ends of all the light emitting bodies on the board, and a second anode wiring one end of which is connected to any one of the first anode wirings, the other end of which is connected to one of the anode terminals of the second connector, and that is not directly connected to the light emitting bodies on the board, or one end of which is connected to one of the anode terminals of the first connector and the other end of which is connected to one of the anode terminals of the second connector, the cathode control signal wiring group includes a first cathode wiring group including at least one first cathode wiring one end of which is connected to one of the cathode terminals of the first connector and the other end of which is connected to the other end of one of the light emitting bodies on the board, and a second cathode wiring group including at least one second cathode wiring one end of which is connected to one of the cathode terminals of the first connector, the other end of which is connected to one of the cathode terminals of the second connector, and that is not connected to the light emitting bodies on the board, the cathode terminals in the first connector to which the first cathode wirings of the first cathode wiring group are connected configure a first cathode terminal group, the cathode terminals in the first connector to which the second cathode wirings of the second cathode wiring group are connected configure a second cathode terminal group, the cathode terminals in the second connector to which other ends of at least some of the second cathode wirings of the second cathode wiring group are connected configure a third cathode terminal group, and the third cathode terminal group is physically located at the same position as that of the first cathode terminal group of the first connector of the light emitting module of the same type having the same number of first cathode wirings or the light emitting module of a different type having the different number of first cathode wirings.

Furthermore, the light emitting module according to the present invention has, in addition to the first characteristic feature, a second characteristic feature in which the second cathode wiring group includes a third cathode wiring group including the second cathode wiring that is not connected to the cathode terminals of the third cathode terminal group.

Furthermore, the light emitting module according to the present invention has, in addition to the second characteristic feature, the third characteristic feature in which the cathode terminals in the first connector to which the second cathode wirings of the third cathode wiring group are connected configure a fourth cathode terminal group, the cathode terminals in the second connector to which the second cathode wirings of the third cathode wiring group are connected configure a fifth cathode terminal group, and the fourth cathode terminal group in the first connector and the fifth cathode terminal group in the second connector are physically located at the same position.

The light emitting module according to the present invention has, in addition to the first characteristic feature, a fourth characteristic feature in which the number of second cathode wirings connected to the cathode terminals of the third cathode terminal group is different from the number of first cathode wirings.

The light emitting module according to the present invention has, in addition to the first characteristic feature, a fifth characteristic feature of including a plurality of anode terminals in each of the first connector and the second connector, and an inter-terminal second anode wiring that is the second anode wiring one end of which is connected to one of the anode terminals in the first connector, the other end of which is connected to one of the anode terminals in the second connector, and that is not connected to the light emitting bodies on the board.

Furthermore, the light emitting module according to the present invention has, in addition to the fifth characteristic feature, a sixth characteristic feature in which the anode terminal in the second connector to which one of the inter-terminal second anode wirings of the second anode wirings is connected is physically located at the same position as the anode terminal in the first connector to which the first anode wiring of another light emitting module is connected.

The light emitting module according to the present invention has, in addition to the fifth characteristic feature, a seventh characteristic feature in which the first anode terminal group including the anode terminals in the first connector to which the inter-terminal second anode wirings of the second anode wirings are connected is physically located at the same position as the second anode terminal group including the anode terminals in the second connector to which the inter-terminal second anode wirings are connected.

The light emitting module according to the present invention has, in addition to any one of the first to seventh characteristic features, an eighth characteristic feature in which the light emitting body is an LED.

A light emitting module unit according to the present invention has a first characteristic feature of including a plurality of light emitting modules each identical with the light emitting module having any one of the first to seventh characteristic features, wherein the light emitting modules are coupled to each other by connecting the second connector of an upstream module and the first connector of a downstream module to each other.

The light emitting module unit according to the present invention has, in addition to the first characteristic feature, a second characteristic feature of including a part where the light emitting modules of different types the numbers of first cathode wirings of which are different from each other are coupled by connecting the second connector of an upstream module and the first connector of a downstream module to each other.

The light emitting module unit according to the present invention has, in addition to the first characteristic feature, a third characteristic feature of including a part where the light emitting modules of the same type the numbers of first cathode wirings of which are equal to each other are coupled by connecting the second connector of an upstream module and the first connector of a downstream module to each other.

The light emitting module unit according to the present invention has a fourth characteristic feature in which a plurality of light emitting modules of the same type or different types are selected from light emitting modules of 1 to 5 types at most in each of which an anode control signal wiring group, a cathode control signal wiring group, and a plurality of light emitting bodies are formed on a board, and a first connector and a second connector each including at least one cathode terminal and at least one anode terminal are formed at end portions of the board, respectively, for each of the selected light emitting modules, the second connector of an upstream module and the first connector of a downstream module are connected to each other to couple the light emitting modules to each other, so that all the light emitting bodies in the selected light emitting modules, the cathode terminals of the first connector in the most upstream light emitting module, and the anode terminals of the first connector in the most upstream light emitting module are electrically connected.

The light emitting module unit according to the present invention which has a fifth characteristic feature in which a plurality of light emitting modules of the same type or different types are selected from light emitting modules of 1 to 5 types at most in each of which an anode control signal wiring group, a cathode control signal wiring group, and a plurality of light emitting bodies are formed on a board, and a first connector and a second connector each including at least one cathode terminal and at least one anode terminal are formed at end portions of the board, respectively, for each of the selected light emitting modules, the second connector of an upstream module and the first connector of a downstream module are connected to each other to couple the light emitting modules to each other, so that all the light emitting bodies in the selected light emitting modules, the cathode terminals of the first connector in the most upstream light emitting module, and the anode terminals of the first connector in the most upstream light emitting module are electrically connected, and the light emitting module is the light emitting module according to any one of the first to seventh characteristic features of the present invention.

A backlight apparatus according to the present invention has a first characteristic feature in which a plurality of light emitting module units each identical with the light emitting module unit according to any one of the first and fourth characteristic features are arranged in a direction orthogonal to a coupling direction of the light emitting modules.

A transmission display apparatus according to the present invention has a first characteristic feature of including a transmission display panel that changes a transmittance of light for each display region to use transmitted light in display and the backlight apparatus according to the first characteristic feature of the present invention, wherein light is radiated from the backlight apparatus on a backside of the transmission display panel to perform display.

Effect of the Invention

According to the present invention, a light emitting module unit including at least an anode wiring, a cathode wiring, and a light emitting body is designed to be able to be decomposed and reconstructed into a plurality of light emitting modules by devising a connection between the anode wiring and the cathode wiring. The light emitting modules are connected through first and second connectors arranged at both ends of the modules. In this manner, the anode wirings and the cathode wirings between different modules are connected to each other.

Basic light emitting modules of a minimum number of types and adjusting light emitting modules including the light emitting modules according to the present invention are prepared, the basic light emitting modules and the adjusting light emitting modules are arbitrarily selected depending on a desired screen size and coupled to each other to make it possible to configure a light emitting module unit of one row. In this manner, the light emitting modules can be shared by panels having different screen sizes.

As a result, preparation of board molds for mount boards of light emitting module units that are required for desired specific screen sizes, respectively, is replaced with preparation of board molds of several types corresponding to the basic module and the adjusting module, and thereby the cost of forming the board molds can be reduced.

BRIEF DESCRIPTION OF THE DRAWINGS

FIG. 12 shows a configuration example (the number of required boards or the like) of a light emitting module board according to the present invention required for each screen size in a backlight apparatus for a liquid crystal display apparatus.

FIG. 23 shows a configuration example of a light emitting module according to still another embodiment of the present invention.

FIG. 24 shows a configuration example of a light emitting module according to yet another embodiment of the present invention.

FIG. 25 shows a configuration example (the number of required boards or the like) of a light emitting module board according to another embodiment required for each screen size in a backlight apparatus for a liquid crystal display apparatus.

EMBODIMENTS FOR CARRYING OUT THE INVENTION

First Embodiment

Figure 1:
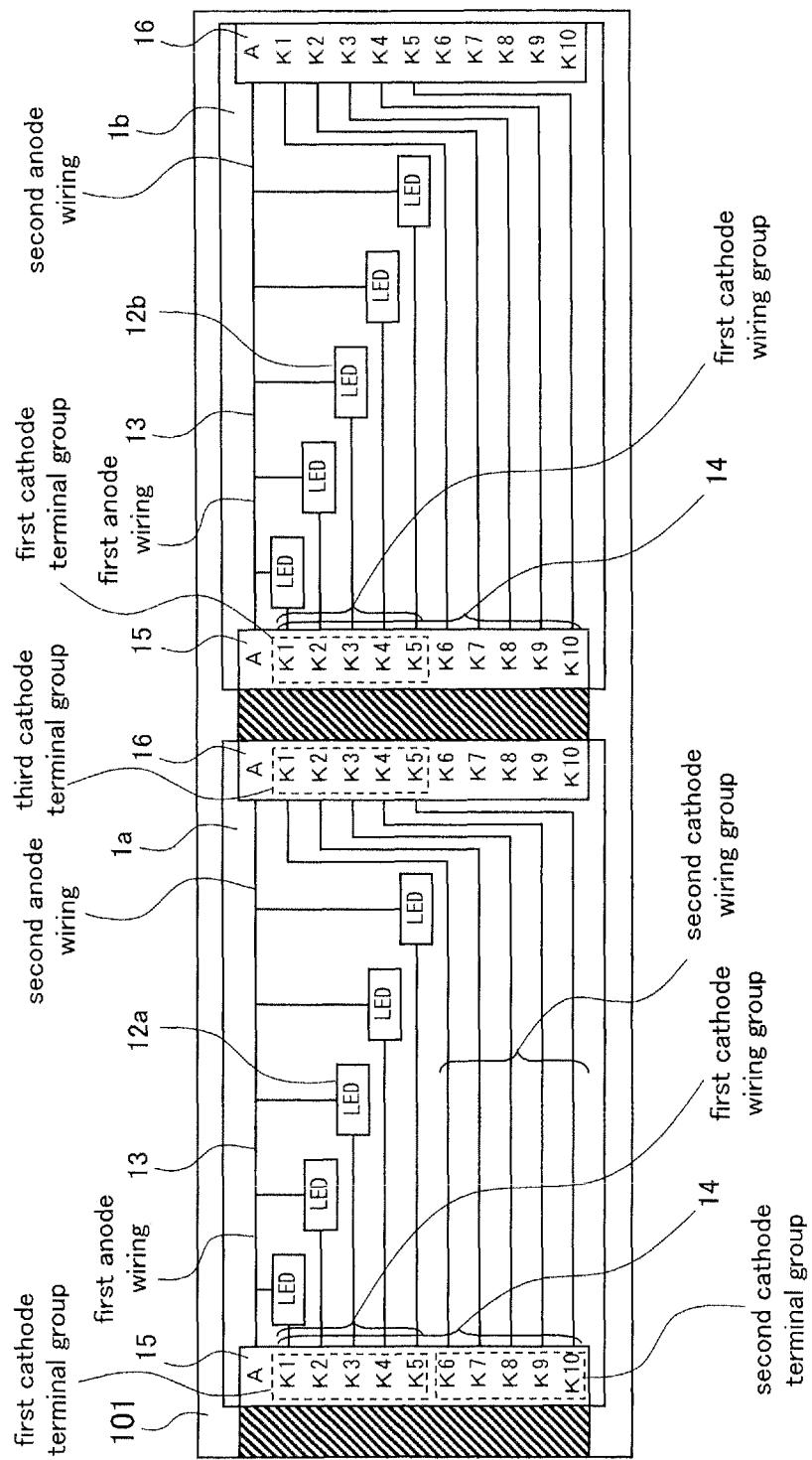
FIG. 1 shows a configuration example of a light emitting module according to a first embodiment of the present invention.

FIG. 1 shows a configuration example of a light emitting module 1 according to an embodiment of the present invention. FIG. 1 is a circuit diagram showing wire connections between cathode control signal wirings (cathode wirings), anode control signal wirings (anode wirings), and light emitting bodies (LED packages) when light emitting modules 1a and 1b of the same type are connected in two levels to configure a light emitting module unit 101. FIG. 1 shows a circuit diagram, an arrangement of the emitting body, the cathode wiring, the anode wiring, and connectors on the board are not always the same as an actual arrangement. However, the anode wiring and the cathode wiring are roughly arranged at one end and the other end in a short-side direction of the board. The same is also applied to circuit diagrams shown in first to fifth embodiments (will be described later).

In the light emitting module unit 101, the light emitting modules 1a and 1b each having a first connector 15 and a second connector 16 formed at both ends are coupled to each other by connecting the second connector 16 of the upstream module 1a and the first connector 15 of the downstream module 1b to each other. Furthermore, the light emitting module unit 101 is connected to an LED driver board 151 (will be described later) through the first connector 15 of the light emitting module 1a.

The light emitting modules 1a and 1b include LED packages 12a and 12b serving as light emitting body, respectively, and each include an anode control signal wiring group 13 including anode wirings, a cathode control signal wiring group 14 including a plurality of cathode wirings, anode terminals A to couple the anode wirings and the connectors 15 and 16 to each other, and cathode terminals K1 to K10 to connect the cathode wirings and the connectors 15 and 16.

As for the LED, an LED package that has a configuration in which an LED chip is mounted on a wiring pattern formed on a surface of an insulating board and sealed with a transparent resin containing a phosphor therearound is used. The wiring pattern is electrically connected to an external electrode on a rear surface side of the insulating substrate, and the LED package emits white light.

The anode control signal wiring group 13 includes, in each of the light emitting modules 1a and 1b, a common first anode wiring one end of which is connected to the anode terminal A of the first connector 15 and the other end of which is branched to be connected to all the LED packages 12a or 12b on the light emitting modules and a second anode wiring that connects the first anode wiring and the anode terminal A of the second connector 16 to each other and that is not directly connected to the LED package 12a or 12b. In this manner, the anode terminal A of the first connector 15 and the anode terminal A of the second connector 16 are connected to each other.

The cathode control signal wiring group 14 includes five first cathode wirings one ends of which are connected to the cathode terminals (K1 to K5) of the first connector and the other ends of which are connected to one of the LED packages 12a and 12b and five second cathode wirings one ends of which are connected to the cathode terminals (K6 to K10) of the first connector 15 and the other ends of which are connected to the cathode terminals (K1 to K5) of the second connector 16.

In this case, a set of the cathode terminals of the first connector to which the first cathode wirings are connected is defined as a first cathode terminal group, and a set of cathode terminals of the first connector to which the second cathode wirings are connected is defined as a second cathode terminal group.

Also, a third cathode terminal group is defined by the cathode terminals of the second connector connected to at least one of the second cathode wirings. The third cathode terminal group is a set of the cathode terminals of the second connector of the upstream light emitting module which connects to the first cathode wirings of the downstream light emitting module through the first connector 15, when another light emitting module is coupled to a downstream side through a connector. The cathode terminals of the third cathode terminal group are physically located at the same positions as those of the cathode terminals of the first connector of the downstream light emitting module to which the first cathode wirings are connected.

The cathode terminals K1 to K5 of the second connector to which the second cathode wirings of the light emitting module 1a are connected are physically located at the same positions as those of the cathode terminals K1 to K5 of the first connector of the light emitting module 1b that are connected to the first cathode wirings of the light emitting module 1b to configure the first cathode terminal group of the light emitting module 1b. In this manner, the light emitting module 1a and the light emitting module 1b are connected to each other through the connectors 15 and 16 to electrically connect the LED package 12b in the light emitting module 1b to an LED driver board 151. More specifically, in the example described above, all the cathode terminals K1 to K5 of the second connector 16 connected to the second cathode wirings of the light emitting module 1a serve as a third cathode terminal group.

In the above description, "the cathode wiring groups are physically arranged at the same positions" means that distances from a predetermined reference line parallel to the long side of the board are equal to each other. For example, in the above example, when a line passing through the anode terminal A of the first connector 15 is defined as the reference line, distances between the reference line and the first cathode terminal groups K1 to K5 are equal to distances between the reference line and the third cathode terminal groups K1 to K5 of the second connector 16, respectively. The same is also applied to the subsequent embodiments.

More specifically, with respect to five LED packages on the light emitting module 1a directly connected to the LED driver board 151, anode control signals are supplied from a common first anode wiring connected to the anode terminal A of the first connector of the light emitting module 1a, and cathode control signals are supplied from the five first cathode wirings connected to the first cathode terminal groups K1 to K5 of the light emitting module 1a. On the other hand, with respect to five LED packages on the light emitting module 1b connected to the LED driver board 151 through the light emitting module 1a, anode control signals are supplied from the first anode wirings of the light emitting module 1b through the second anode wirings of the light emitting module 1a and the anode terminals A of the connectors 15 and 16 between the light emitting modules 1a and 1b, and cathode control signals are supplied from five first cathode wirings of the light emitting module 1b through the second cathode terminal groups K6 to K10 of the light emitting module 1a connected to the LED driver 151, the second cathode wirings of the light emitting module 1a, and the first cathode terminal groups K1 to K5 of the light emitting module 1b. Thus, each of the LED packages can be independently driven by the above wiring layout.

Consequently, all the 10 LED packages arranged on the light emitting module unit 101 are electrically connected. The lengths of the light emitting modules in the longitudinal direction are adjusted such that, when the light emitting modules 1a and 1b are coupled to each other, all the LED packages are arranged at predetermined intervals.

Figure 2:
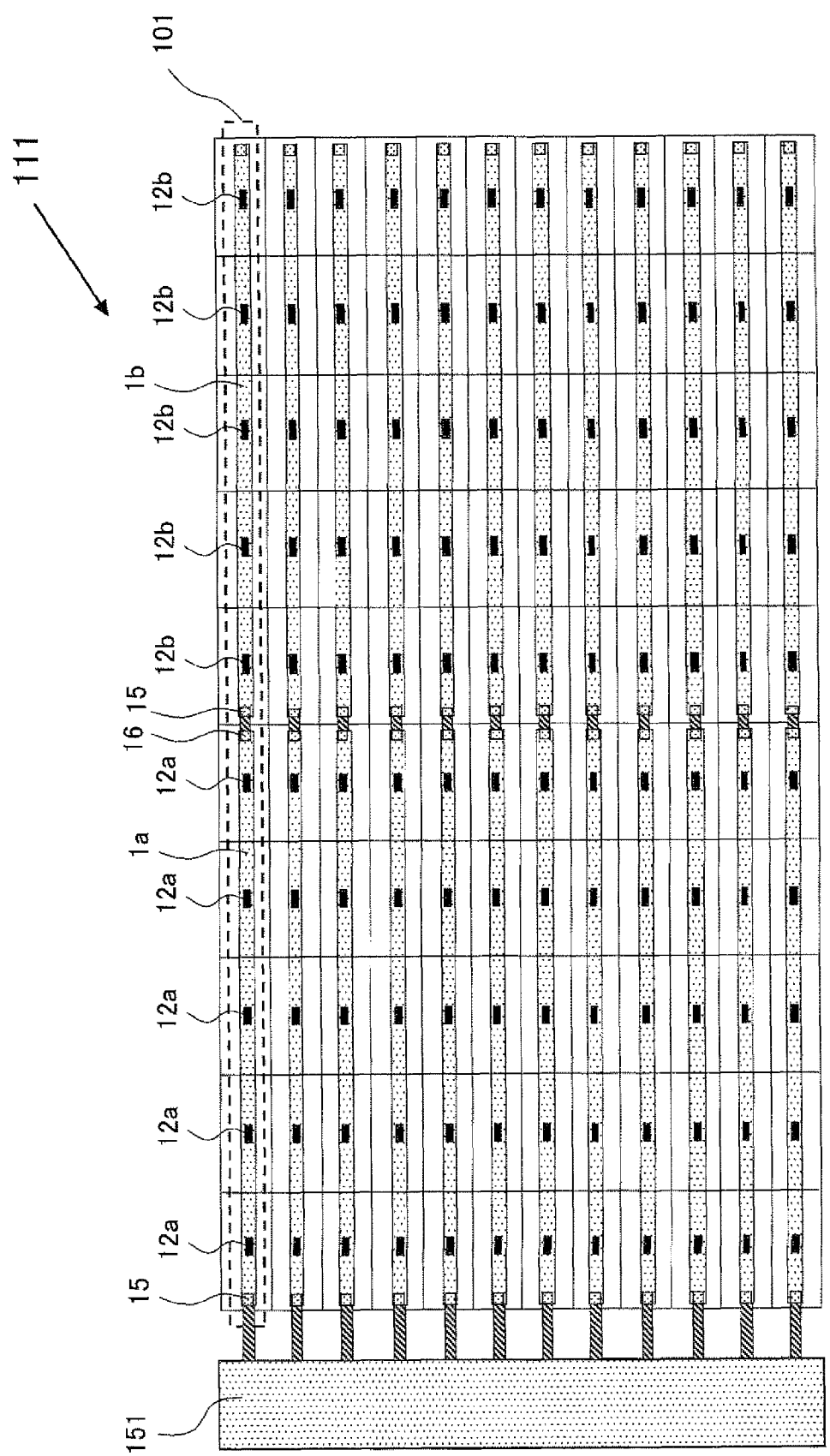
FIG. 2 shows an example in which a backlight board is configured by using a light emitting module according to the first embodiment of the present invention.

FIG. 2 shows a configuration example of a backlight board 111 using the light emitting module unit 101 shown in FIG. 1. The backlight board 111 is configured such that the plurality of light emitting module units 101 described above are connected to the LED driver board 151 through the connector 15 of the light emitting module 1a. FIG. 2 shows a physical arrangement of constituent elements and shows that all the LED packages in the light emitting module unit 101 are uniformly arranged in the longitudinal directions of the light emitting modules 1a and 1b. FIG. 2 shows an example in which the light emitting module units 101 are connected in 12 rows.

Figure 3:
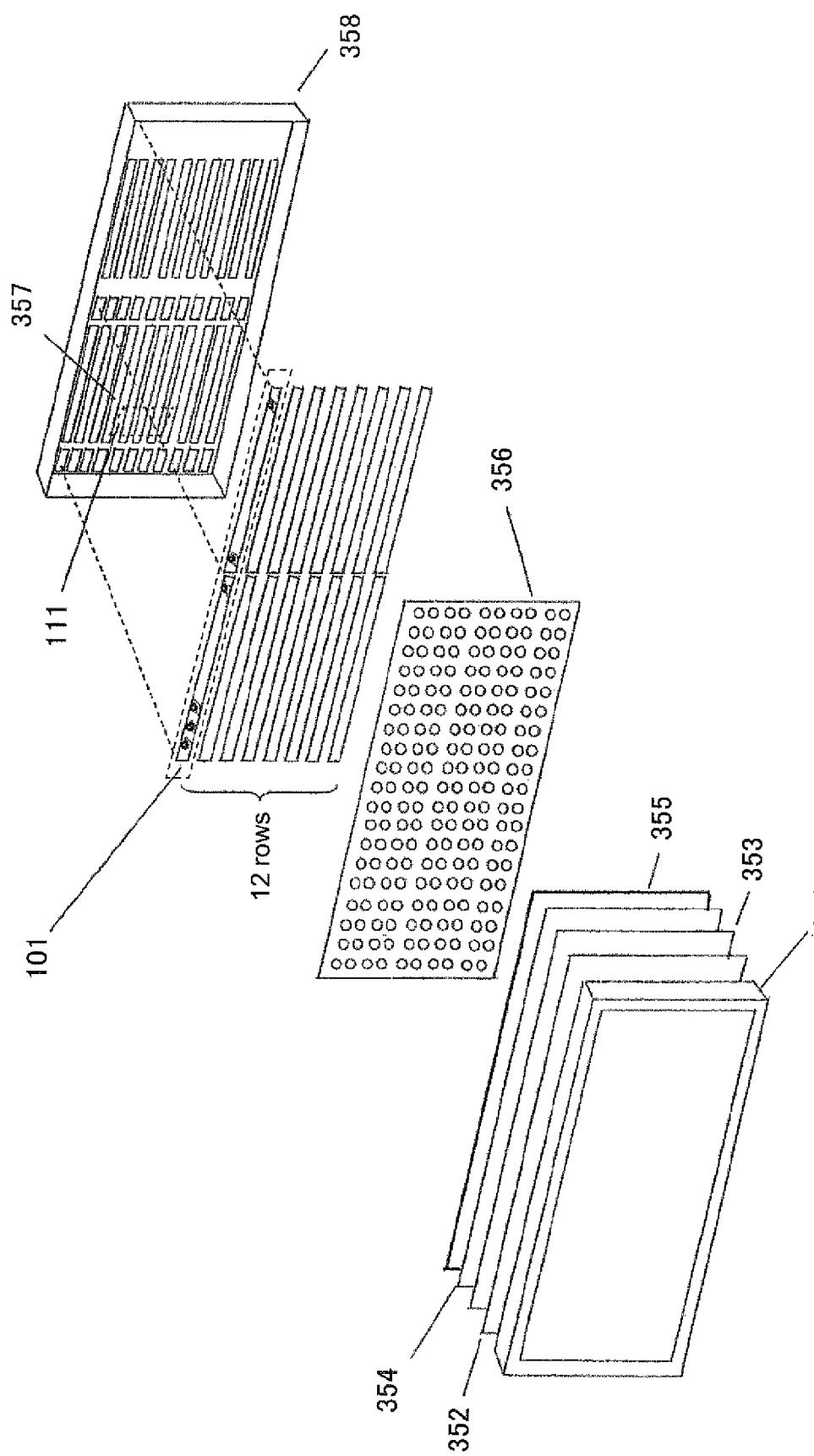
FIG. 3 is a configuration diagram of a backlight system.

FIG. 3 is a diagram showing a configuration of a backlight system 301 on which the backlight board 111 according to the present invention is mounted. In the backlight system 301, the backlight board 111 in which the light emitting module units 101 described above are parallel arranged in 12 rows and connected to the LED driver board 151 is made to adhere a backlight chassis 358 by a heat-conductive double-face tape 357. In the configuration, a reflector 356 is arranged in front of the backlight board 111, a diffusion plate 355 is arranged in front of the reflector 356, a diffusion sheet 354 is arranged in front of the diffusion plate 355, a prism sheet 353 is arranged in front of diffusion sheet 354, a polarizing plate 352 is arranged in front of the prism sheet 353, and a liquid crystal panel unit 351 is arranged in front of the polarizing plate 352. Light from the LED package on the backlight board 111 is radiated from a backside of the liquid crystal panel unit 351 through the reflector 356, the diffusion plate 355, the diffusion sheet 354, the prism sheet 353, and the polarizing plate 352, and transmitted light the transmittance of which is controlled for each display region emerges on the front face of the liquid crystal panel unit 351.

The backlight board 111 may be fixed to the backlight chassis 358 with a screw. In this case, since the light emitting module unit 101 can be easily detached, even though a drawback may be detected in a light emitting module by an inspection or the like of a backlight system, the light emitting module unit 101 can be easily replaced. In a region that is not occupied by the light emitting module unit 101 of the backlight chassis 358, the reflector 356 has an inclined surface at an end portion to reflect light to the front face.

Second Embodiment

Figure 4:
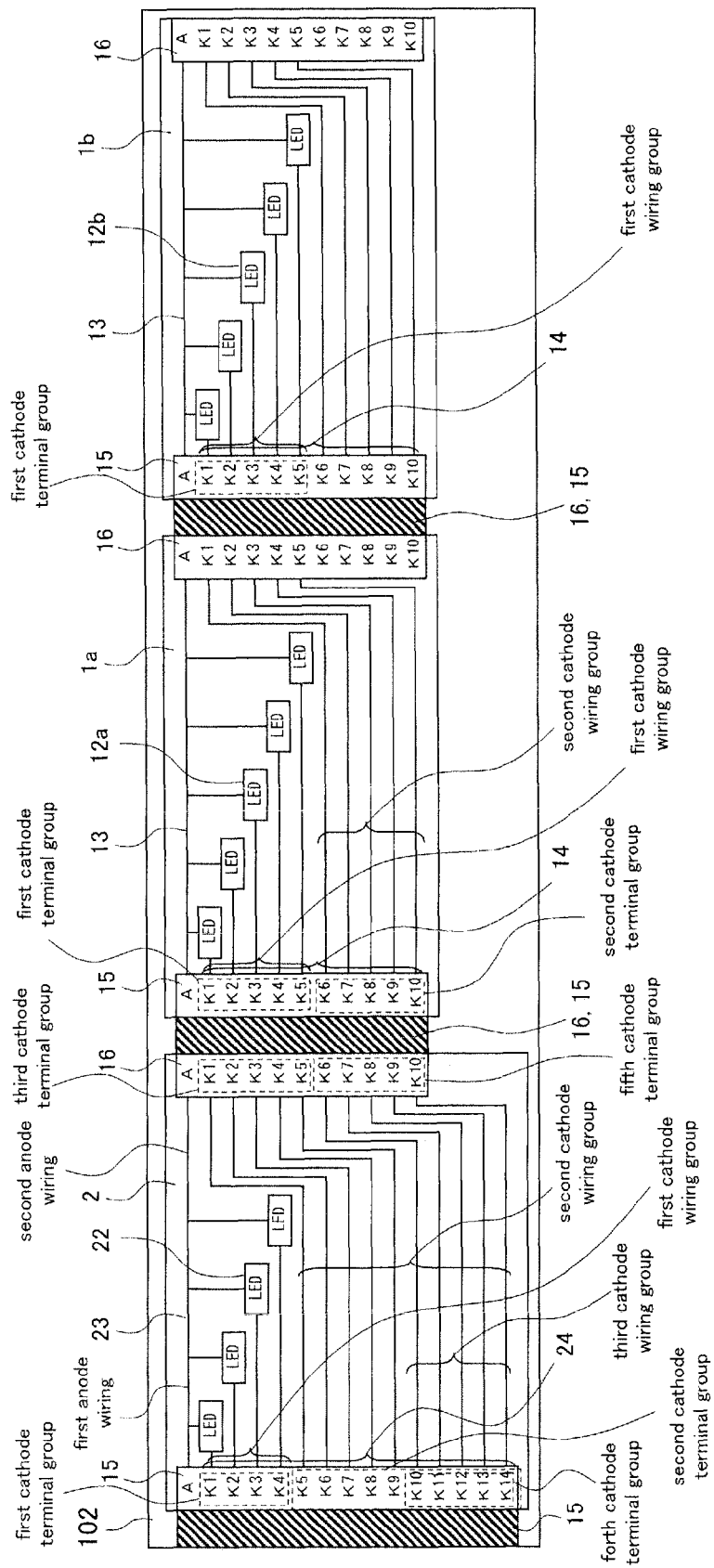
FIG. 4 shows a configuration example of a light emitting module according to a second embodiment of the present invention.

FIG. 4 shows a configuration example of a light emitting module 2 according to an embodiment of the present invention. The embodiment shows an example in which, when a screen size required for a backlight system cannot be covered by connecting light emitting modules of the same type in a plurality of levels, an adjusting light emitting module 2 is further connected to make it possible to configure a light emitting module unit 102 and a backlight board 112. FIG. 4 is a circuit diagram showing wire connections between the cathode control signal wirings (cathode wirings), the anode control signal wirings (anode wirings), and the light emitting bodies (LED packages) in a configuration in which, in addition to the light emitting modules 1*a* and 1*b* according to the first embodiment, the adjusting light emitting module 2 is connected between an LED driver board 152 and the light emitting module 1*a*, and the light emitting modules are connected in a total of three levels to form the light emitting module unit 102.

The modules of the light emitting module unit 102 are coupled to each other such that the two light emitting modules 1*a* and 1*b* of the same type having the first connector 15 and the second connector 16 at both the ends are connected by the second connector of the light emitting module 1*a* and the first connector of the light emitting module 1*b*, and the light emitting module 2 having the first connector 15 and the second connector 16 at both the ends is connected to the light emitting module 1*a* by the second connector of the light emitting module 2 and the first connector of the light emitting module 1*a*. Furthermore, the light emitting module unit 102 is connected to an LED driver board 152 through the first connector 15 of the light emitting module 2.

As in the first embodiment, the light emitting modules 1*a* and 1*b* include the LED packages 12*a* and 12*b* serving as light emitting bodies, respectively, and each include the anode control signal wiring group 13 including anode wirings, the cathode control signal wiring group 14 including a plurality of cathode wirings, the anode terminals A to couple the anode wirings and the connectors 15 and 16 to each other, and the cathode terminals K1 to K10 to connect the cathode wirings and the connectors 15 and 16 to each other.

The light emitting module 2 includes an LED 22 serving as a light emitting body, the anode control signal wiring group 23 including anode wirings, a cathode control signal wiring group 24 including a plurality of cathode wirings, the anode terminals A to couple the anode wirings and the connectors 15 and 16 to each other, the cathode terminals K1 to K14 on the first connector 15 side to connect the cathode wirings and the connectors 15 and 16 to each other, and the cathode terminals K1 to K10 on the second connector 16 side.

The anode control signal wiring group 23 includes a common first anode wiring one end of which is connected to the anode terminal A of the first connector 15 of the light emitting module 2 and the other end of which is branched to be directly connected to all the LED packages 22 on the light emitting module 2 and a second anode wiring that connects the first anode wiring and the anode terminal A of the second connector 16 to each other and that is not directly connected to the LED package 22. In this manner, the anode terminal A of the first connector 15 and the anode terminal A of the second connector 16 are connected to each other. The second connector of the downstream light emitting module 2 and the first connector of the upstream light emitting module 1*a* are connected to each other through the anode terminal A to make it possible to supply anode control signals from the LED driver board 152 to all the LED packages included in the light emitting module 2, the light emitting module 1*a*, and the light emitting module 1*b*.

The cathode control signal wiring group 24 includes 4 first cathode wirings one ends of which are connected to the cathode terminals K1 to K4 of the first connector of the light emitting module 2 and the other ends of which are connected to one of the LED packages 22, and 10 second cathode wirings one ends of which are connected to cathode terminals K5 to K14 of the first connector of the light emitting module 2 and the other ends of which are connected to the cathode terminals K1 to K10 of the second connector of the light emitting module 2. Some of the second cathode wirings, i.e., the five second cathode wirings connected to the cathode terminals K5 to K9 of the first connector of the light emitting module 2 are connected to the cathode terminals K1 to K5 of the second connector of the light emitting module 2, respectively. However, the cathode terminals K1 to K5 of the second connector of the light emitting module 2 are physically arranged at the same positions as those of the first cathode terminal groups K1 to K5 of the light emitting module 1*a*. In this manner, the light emitting module unit 2 and the light emitting module 1*a* are connected to each other through the connectors 15 and 16 to electrically connect the LED packages 12*a* in the light emitting module 1*a* to the LED driver board 152. In the above example, the cathode terminals K1 to K5 that are some of the cathode terminals K1 to K10 of the second connector connected to the second cathode wirings of the light emitting module 2 are connected to the first cathode wirings of the light emitting module 1*a* to serve as the third cathode terminal group.

On the other hand, of the second cathode wirings of the light emitting module unit 2, the remaining five second cathode wirings that are not connected to the first cathode wirings of the light emitting module 1*a*, i.e., the second cathode wirings (third cathode wiring group) that are connected to the cathode terminals K10 to K14 (fourth cathode terminal group) of the first connector of the light emitting module 2 and connected to the cathode terminals K6 to K10 (fifth cathode terminal group) of the second connector of the light emitting module 2 are connected to the second cathode wirings of the light emitting module 1a through the second cathode terminal groups K6 to K10 of the light emitting module 1a, respectively, connected to the first cathode wirings of the light emitting module 1b through the first cathode terminal groups K1 to K5 of the light emitting module 1b, and connected to the LED packages 12b of the light emitting module 1b. In this manner, with respect to all the LED packages included in the light emitting module 2, the light emitting module 1a, and the light emitting module 1b, cathode control signals can be supplied from the LED driver board 152. Each of the LED packages can be independently driven by the above wiring layout.

In this case, of the second cathode wirings, a set of wirings that are not connected to the cathode terminals of the third cathode terminal group is defined as a third cathode wiring group, the cathode terminals of the first connector to which the second cathode wirings of the third cathode wiring group are connected are defined as a fourth cathode terminal group, and the cathode terminals of the second connector to which the second cathode wirings of the third cathode wiring group are connected are defined as a fifth cathode terminal group.

Therefore, all the 14 LED packages arranged on the light emitting module unit 102 are electrically connected to each other. An arrangement interval between the LEDs on the adjusting light emitting module 2 is equal to that of each of the light emitting modules 1a and 1b. A length of the adjusting light emitting module 2 in the longitudinal direction is adjusted to fall within the range of a screen size in the embodiment when the light emitting modules 2, 1a, and 1b are coupled to each other.

Figure 5:
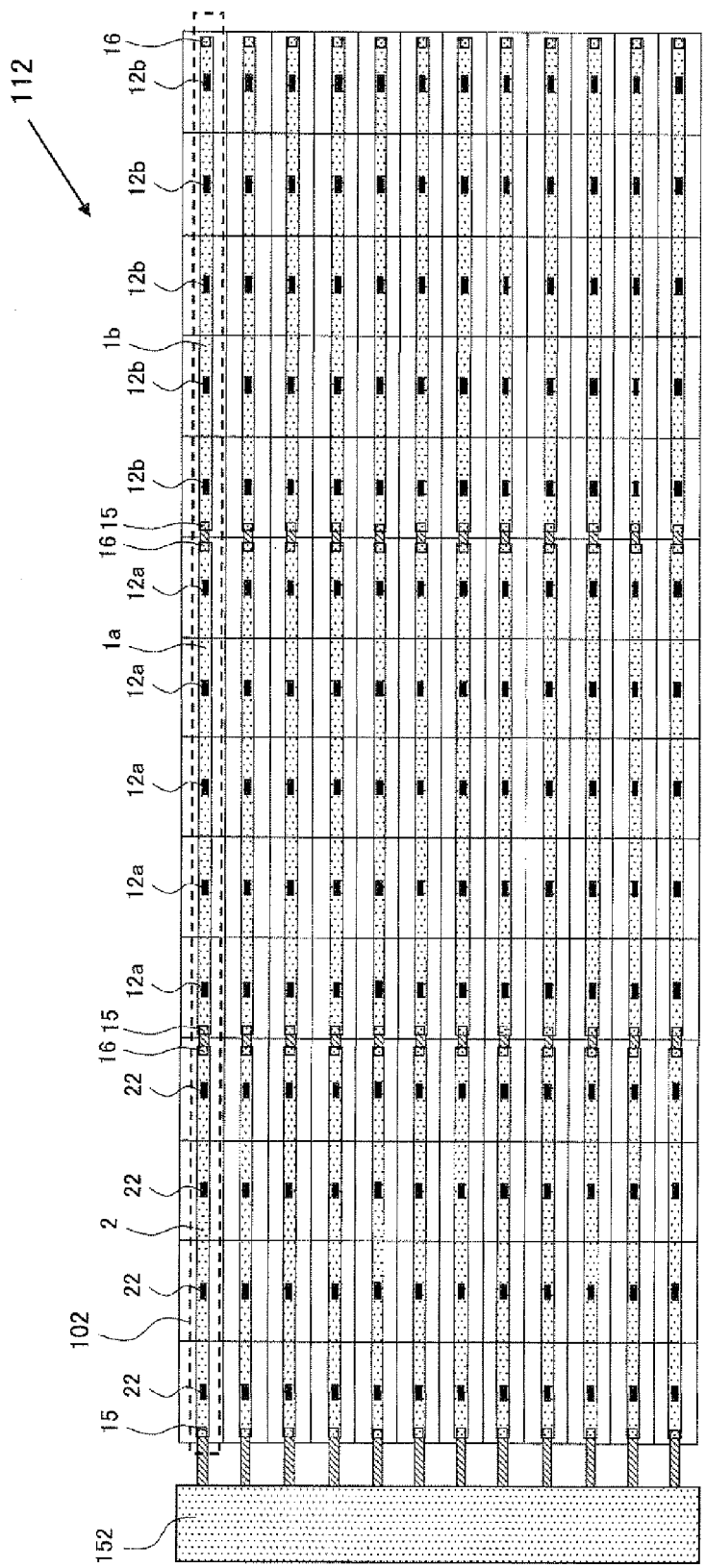
FIG. 5 shows an example in which a backlight board is configured by using the light emitting module according to the second embodiment of the present invention.

FIG. 5 shows a configuration example of the backlight board 112 using the light emitting module unit 102 shown in FIG. 4. The backlight board 112 is configured such that the plurality of light emitting module units 102 are connected to the LED driver board 152 through the connector 15 of the light emitting module 2. FIG. 5 shows a physical arrangement of the constituent elements, and especially shows that all the LED packages in the light emitting module unit 102 are uniformly arranged in the longitudinal direction of the light emitting modules 2, 1a, and 1b. Note that, FIG. 5 shows an example in which the light emitting module units 102 are connected in 12 rows.

The backlight board 112, as in the first embodiment, can also be mounted in a backlight system.

Third Embodiment

Figure 6:
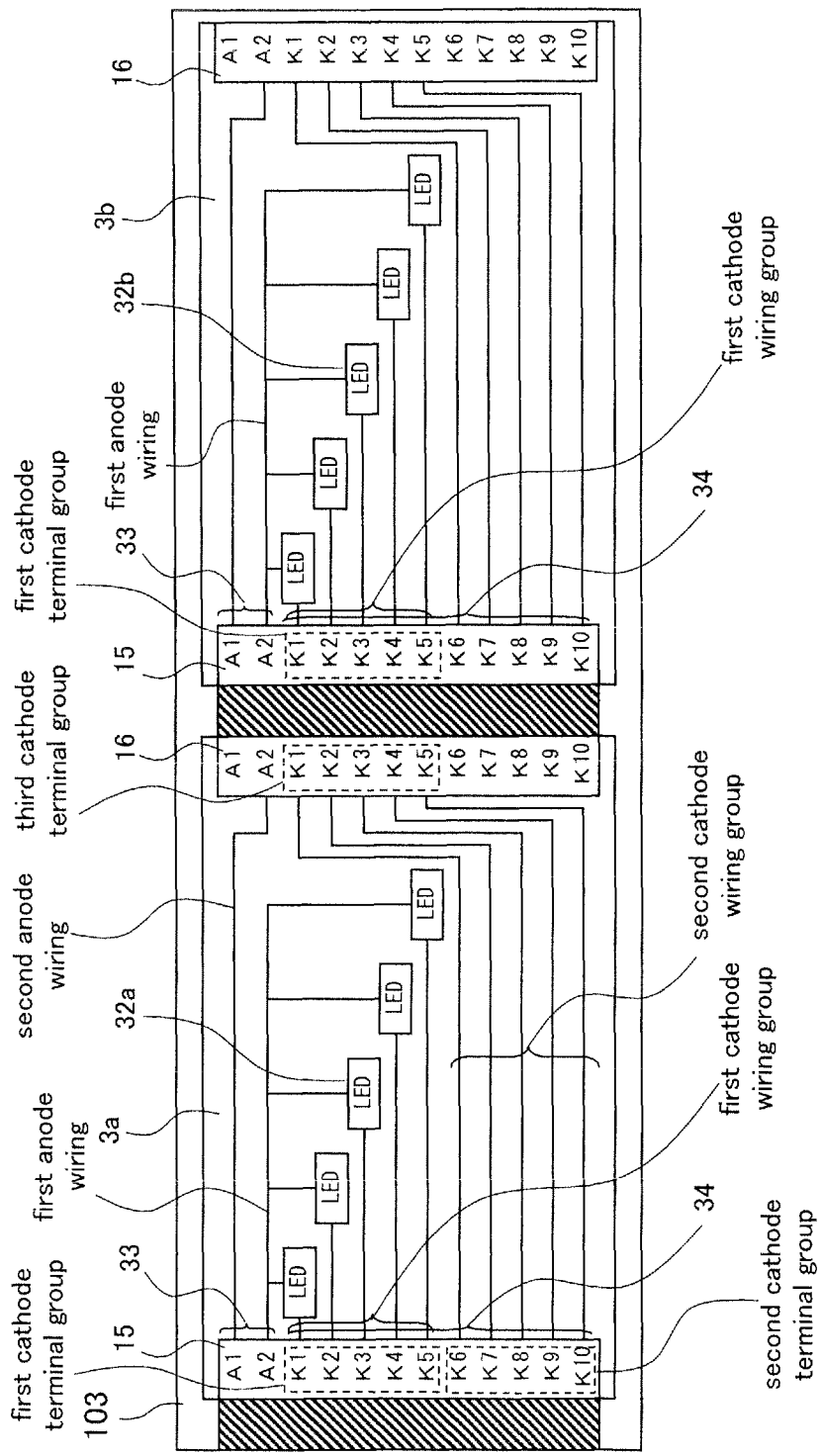
FIG. 6 shows a configuration example of a light emitting module according to a third embodiment of the present invention.

FIG. 6 shows a configuration example of a light emitting module 3 according to an embodiment of the present invention. The embodiment shows an example in which, as a measure against shortage of a drive current supplied to all the LEDs on the light emitting modules connected to each other through the connectors when signals are received from the LED driver board by using a common anode control signal wiring, the light emitting modules 3 in which a plurality of anode control signal wirings are prepared are connected in a plurality of levels to make it possible to configure a light emitting module unit 103 and a backlight board 113. FIG. 6 is a circuit diagram showing wire connections between cathode control signal wirings (cathode wirings), anode control signal wirings (anode wirings), and light emitting bodies (LED packages) when light emitting modules 3a and 3b of the same type each having a plurality of anode control signal wirings are connected in two levels and connected to an LED driver board 153 to configure the light emitting module unit 103. Note that, since a method of connecting cathode signal wirings is the same as that in the first embodiment, a description thereof will be omitted. A method of connecting anode signal wirings will be described below in detail.

In the light emitting module unit 103, the light emitting modules 3a and 3b of the same type each having the first connector 15 and the second connector 16 at both the ends are coupled to each other in two levels, by connecting the second connector of the upstream module 3a and the first connector of the downstream module 3b to each other. Furthermore, the light emitting module unit 103 is also connected to the LED driver board 153 (not shown) through the first connector of the light emitting module 3a.

The light emitting modules 3a and 3b include LED packages 32a and 32b serving as light emitting bodies, respectively, and each include an anode control signal wiring group 33 including a plurality of anode wirings, a cathode control signal wiring group 34 including a plurality of cathode wirings, anode terminals A1 and A2 to couple the anode wirings and the connectors 15 and 16 to each other, and cathode terminals K1 to K10 to connect the cathode wirings and the connectors 15 and 16 to each other.

The anode control wiring group 33 includes, in each of the light emitting modules 3a and 3b, a common first anode wiring one end of which is connected to an anode terminal A2 of the first connector 15 and the other end of which is branched to be connected to all LED packages 32a or 32b on the light emitting modules and one second anode wiring that connects the anode terminal A1 of the first connector and the anode terminal A2 of the second connector and is not connected to the LED packages.

In this case, of the second anode wirings, wirings that connect the anode terminals of the first connector and the anode terminals of the second connector to each other and are not connected to the LED packages are defined as inter-terminal second anode wirings. In the above example, the second anode wiring that connects the anode terminal A1 of the first connector and the anode terminal A2 of the second connector is the inter-terminal second anode wiring.

The second anode wiring (inter-terminal second anode wiring) of the light emitting module 3a is connected to the anode terminal A2 of the second connector, and the first anode wiring of the light emitting module 3b is connected to the anode terminal A2 of the first connector. Both the anode terminals are physically located at the same position. In this manner, the light emitting module unit 3a and the light emitting module 3b are connected to each other through the connectors 15 and 16 to connect the second anode wiring (inter-terminal second anode wiring) of the light emitting module 3a and the first anode wiring of the light emitting module unit 3b to each other, and all LED packages 32 of the light emitting module unit 3b are electrically connected to the LED driver board 153 (not shown).

More specifically, the five LED packages on the light emitting module 3a can receive anode control signals supplied from the first anode wirings of the light emitting module 3a through the anode terminal A2 of the first connector 15 of the light emitting module 3a, and the five LED packages on the light emitting module 3b can receive anode control signals supplied from the first anode wirings of the light emitting module 3b through the anode terminal A1 of the first connector of the light emitting module 3a, the second anode wiring of the light emitting module 3a, and the anode terminals A2 of the connectors 15 and 16 between the light emitting modules 3a and 3b.

The light emitting module unit 103 described above, as in the first and second embodiments, can be mounted in a backlight system by connecting the plurality of light emitting module units 103 to the LED driver board to configure a backlight board.

Fourth Embodiment

As described in the above embodiment, light emitting modules of the same type or adjusting light emitting modules are connected in a plurality of levels to configure a light emitting module unit to configure a backlight board, so as to make it possible to configure a backlight system corresponding to various screen sizes. More specifically, a description will be given below of an example in which basic light emitting modules of three types and adjusting light emitting modules of two types are combined to each other to configure a light emitting module unit 4 that can be applied to liquid crystal display apparatuses having screen sizes of 13 to 80 inches.

FIGS. 7 to 11 are circuit diagrams showing wire connections between cathode control signal wirings (cathode wirings), anode control signal wirings (anode wirings), and light emitting bodies (LED packages) with respect to basic light emitting modules M01 to M03 of three types and adjusting light emitting modules M04 and M05 of two types that are used in combination in the light emitting module unit 4. The light emitting modules M01 to M05 have the anode terminals A1 and cathode terminals K01 to K38 in each of the first connector 15 and the second connector 16. The anode control signal wiring includes, in each of the light emitting modules M01 to M05, a common first anode wiring one end of which is connected to the anode terminal A1 of the first connector 15 and the other end of which is branched to be connected to all the LED packages on the light emitting module and a second anode wiring that connects the first anode wiring and the anode terminal A1 of the second connector 16 to each other and is not directly connected to the LED packages. In this manner, the anode terminal A1 of the first connector 15 and the anode terminal A1 of the second connector 16 are connected to each other. In each of the light emitting modules M01 to M05, LED packages 42 serving as light emitting bodies are arranged on narrow strips of board at 50-mm intervals. Also when the light emitting modules are connected to each other, the longitudinal size of the modules is defined such that the intervals between the LED packages are kept at 50 mm as described above. An arrangement of the light emitting modules in a row direction (vertical direction of screen) is adjusted such that an arrangement interval is defined to 50 mm, and a center position between the light emitting modules at both the ends in the vertical direction of screen is positioned in the center of the screen. An LED package 42 employs an LED package of a lead frame type emitting white light. The LED package is insert-molded with a light-reflecting resin for a lead frame on which an LED chip is mounted. The LED chip is surrounded by the light-reflecting resin and sealed with a transparent resin containing a phosphor. Eight LED packages, six LED packages, and five LED packages are mounted on the basic light emitting modules M01, the basic light emitting modules M02, and the basic light emitting modules M03, respectively. Four LED packages and three LED packages are mounted on the adjusting light emitting module M04 and the adjusting light emitting module M05, respectively.

Figure 7:
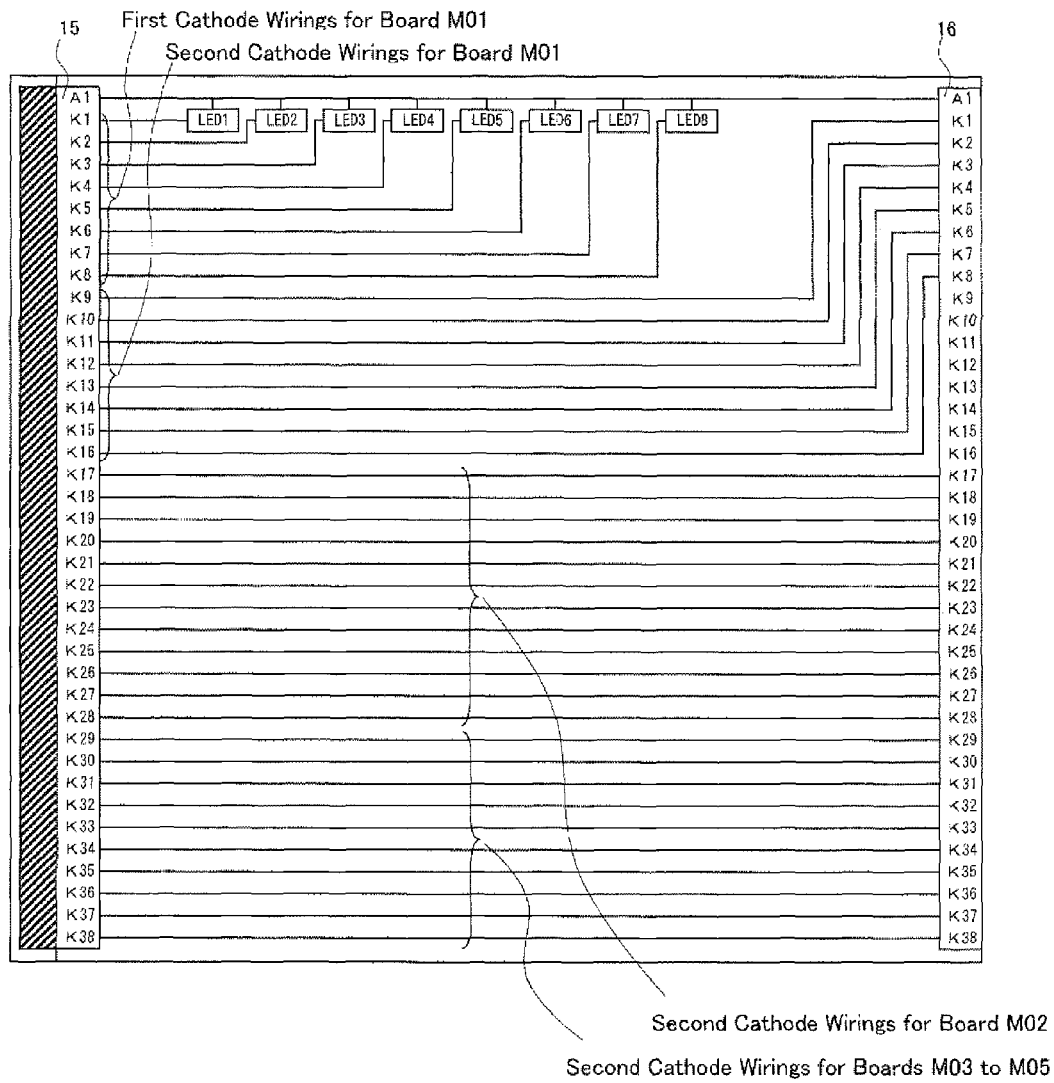
FIG. 7 shows a configuration example of a light emitting module according to a fourth embodiment of the present invention.

FIG. 7 is a circuit diagram showing wire connections between cathode control signal wirings (cathode wirings), the anode control signal wirings (anode wirings), and light emitting bodies (LED packages) of the basic light emitting module M01. The cathode control signal wiring group of the light emitting module M01 includes eight first cathode wirings (first cathode wirings for board M01) that are connected to the first cathode terminal groups K1 to K8 and the LED packages, respectively, and 30 second cathode wirings that are connected to the second cathode terminal groups K9 to K38, respectively and that are not connected to the LED packages. Of the second cathode wirings, eight second cathode wirings (second cathode wirings for board M01) connected to the cathode terminals K9 to K16 of the first connector are connected to the cathode terminals K1 to K8 of the second connector, respectively, and are also connected to the cathode terminals of the first cathode terminal groups K1 to K8 of the downstream basic light emitting module M01 by connecting the basic light emitting module M01 of the same type at the downstream side. In this manner, the LED packages of the downstream basic light emitting module M01 are connected to the cathode terminals K9 to K16 of the first connector through the eight second cathode wirings (second cathode wirings for board M01) of the upstream basic light emitting module M01.

Of the second cathode wirings of the basic light emitting module M01, 22 second cathode wirings connected to the cathode terminals K17 to K38 of the first connector, respectively, are connected to the cathode terminal groups K17 to K38 of the second connector, respectively, that are physically located at the same positions as those of the cathode terminal groups K17 to K38 of the first connector to which the second cathode wirings are connected. In this manner, when any one of the light emitting modules M01 to M05 is connected at the downstream side, the 22 second cathode wirings can be connected to the second cathode wirings of the light emitting module M01 of the same type or the first cathode wirings and the second cathode wirings of the light emitting modules M02 to M05 of different types. In the embodiment, in particular, the 12 second cathode wirings connected to the cathode terminals K17 to K28 are used to connect the basic light emitting module M02, and the 10 second cathode wirings connected to the cathode terminals K29 to K38 are used to connect the basic light emitting module M03 and the adjusting light emitting modules M04 and M05. For example, when the light emitting module M01 is connected at the downstream side, the cathode terminals K1 to K8 of the second connector serve as a third cathode terminal group, the cathode terminals K17 to K38 of the first connector serve as a fourth cathode terminal group, the cathode terminals K17 to K38 of the second connector serve as a fifth cathode terminal group, and the fourth cathode terminal group and the fifth cathode terminal group are physically located at the same position.

Figure 8:
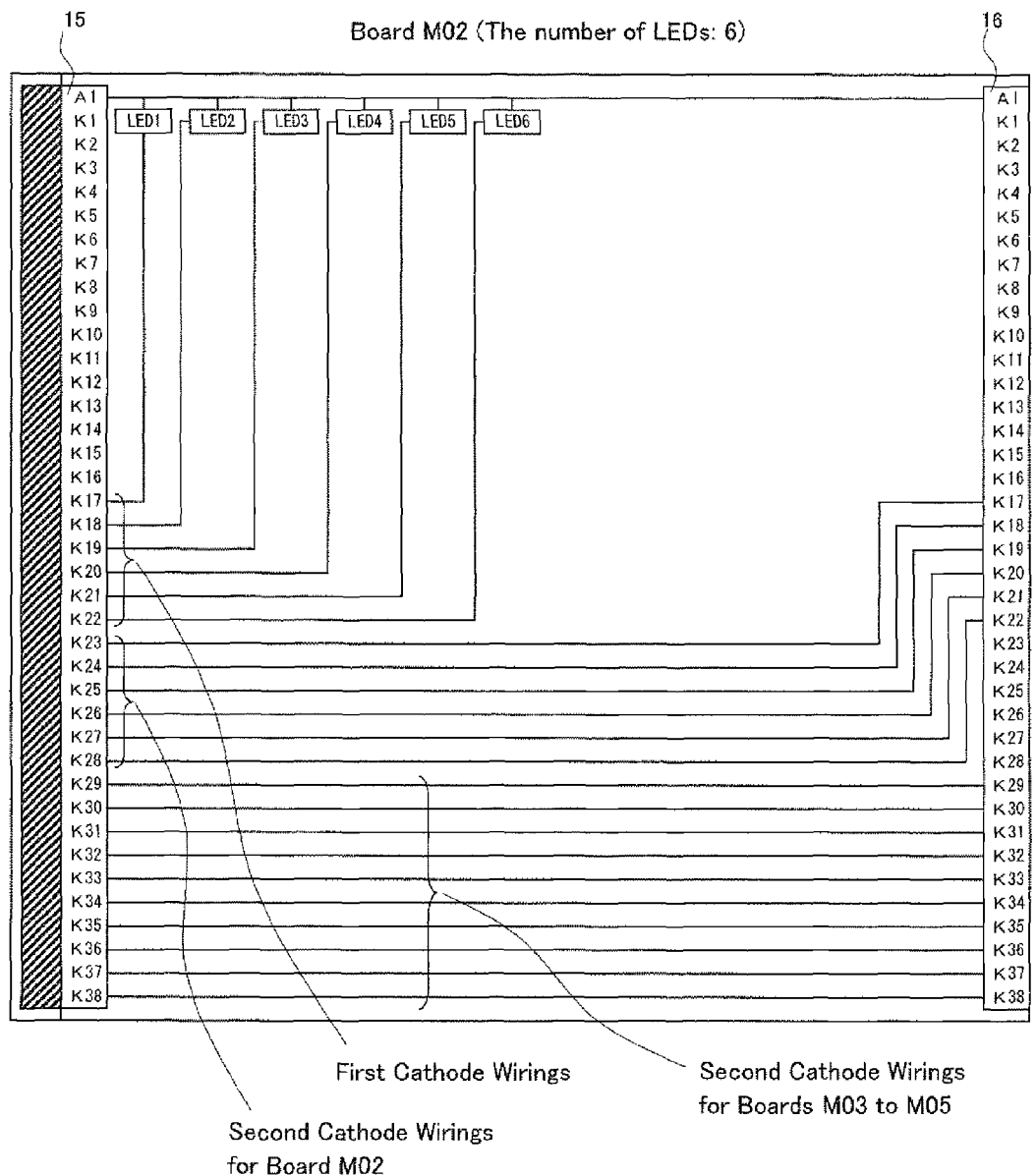
FIG. 8 shows a configuration example of a light emitting module according to the fourth embodiment of the present invention.

FIG. 8 is a circuit diagram showing wire connections between cathode control signal wirings (cathode wirings), anode control signal wirings (anode wirings), and light emitting bodies (LED packages) of the basic light emitting module M02. The cathode control signal wiring group of the light emitting module M02 includes six first cathode wirings (first cathode wirings for board M02) connected to the first cathode terminal groups K17 to K22 and the LED packages, respectively, and 16 second cathode wirings that are connected to the second cathode terminal groups K23 to K38, respectively, and are not connected to the LED packages. Of the second cathode wirings, six second cathode wirings (second cathode wirings for board M02) connected to the cathode terminals K23 to K28 of the first connector, respectively, are connected to the cathode terminals K17 to K22 of the second connector, respectively, and connected to the cathode terminals of the first cathode terminal groups K17 to K22 of the downstream basic light emitting module M02 by connecting the basic light emitting module M02 of the same type at the downstream side. In this manner, the LED packages of the downstream basic light emitting module M02 are connected to the cathode terminals K23 to K28 of the first connector through the six second cathode wirings (second cathode wirings for board M02) of the upstream basic light emitting module M02.

Of the second cathode wirings of the basic light emitting module M02, 10 second cathode wirings connected to the cathode terminals K29 to K38 of the first connector, respectively, are connected to the cathode terminal groups K29 to K38 of the second connector, respectively, that are physically located at the same positions as those of the cathode terminal groups K29 to K38 of the first connector to which the second cathode wirings are connected. In this manner, when any one of the light emitting modules M07 to M05 is connected at the downstream side, the 10 second cathode wirings can be connected to the second cathode wirings of the light emitting module M02 of the same type or the first cathode wirings and the second cathode wirings of the light emitting modules M03 to M05 of different types. In the embodiment, the 10 second cathode wirings connected to the cathode terminals K29 to K38 are used to connect the basic light emitting module M03 and the adjusting light emitting modules M04 and M05. For example, when the light emitting module M02 is connected at the downstream side, the cathode terminals K17 to K22 of the second connector serve as a third cathode terminal group, the cathode terminals K29 to K38 of the first connector serve as a fourth cathode terminal group, the cathode terminals K29 to K38 of the second connector serve as a fifth cathode terminal group, and the fourth cathode terminal group and the fifth cathode terminal group are physically located at the same position.

Figure 9:
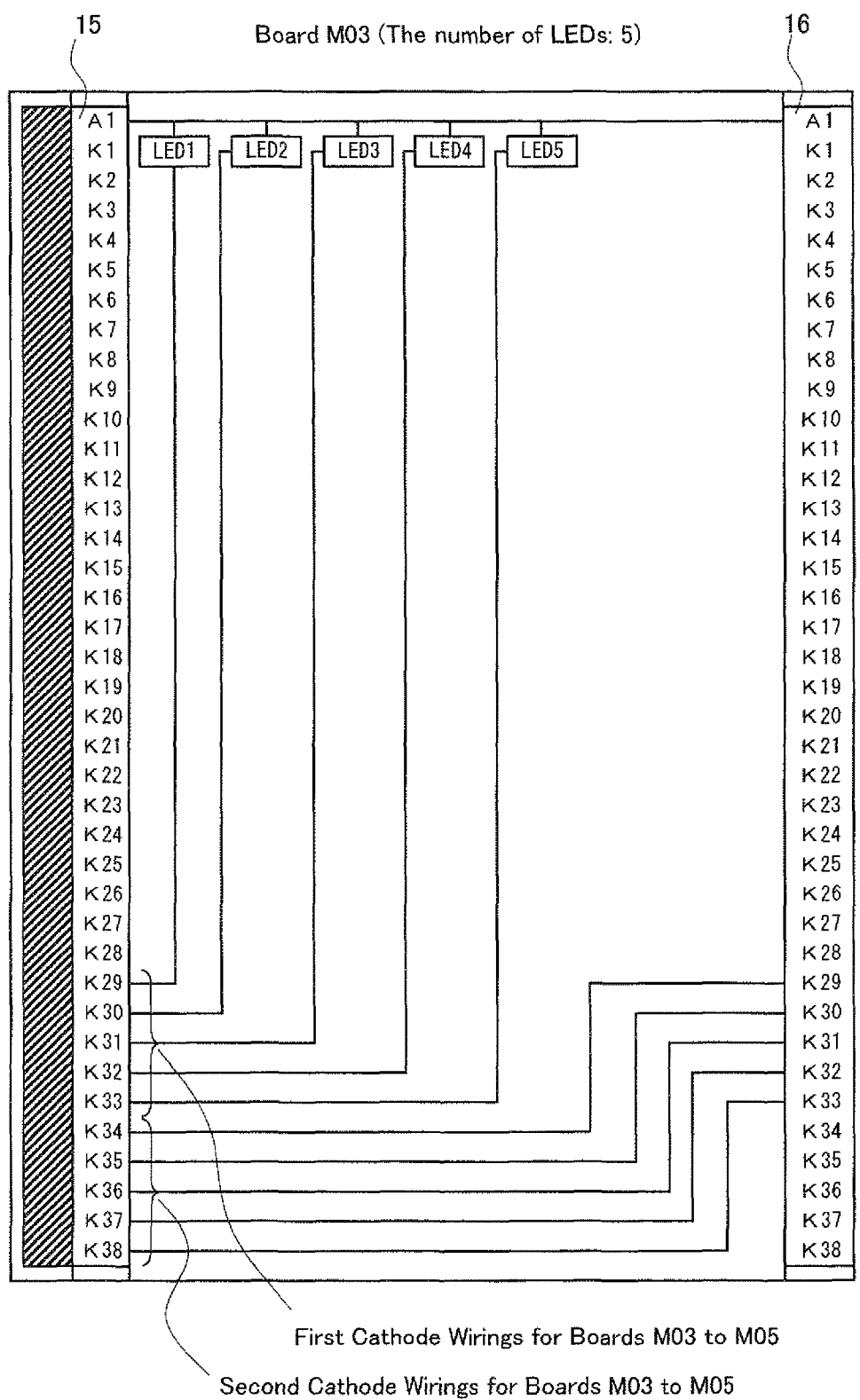
FIG. 9 shows a configuration example of a light emitting module according to the fourth embodiment of the present invention.

FIG. 9 is a circuit diagram showing wire connections between cathode control signal wirings (cathode wirings), anode control signal wirings (anode wirings), and light emitting bodies (LED packages) of the basic light emitting module M03. The cathode control signal wiring group of the light emitting module M03 includes five first cathode wirings (first cathode wirings for board M03 to M05) that are connected to the first cathode terminal groups K29 to K33 and the LEDs, respectively, and five second cathode wirings (second cathode wirings for boards M03 to M05) that are connected to the second cathode terminal groups K34 to K38, respectively, and that are not connected to the LED packages. The five second cathode wirings are connected to the cathode terminals K29 to K33 of the second connector, respectively, and also connected to the cathode terminals of the first cathode terminal groups K29 to K33 of the downstream basic light emitting module M03 by connecting the basic light emitting module M03 of the same type at the downstream side. In this manner, the LED packages of the downstream basic light emitting module M03 are connected to the second cathode terminal groups K34 to K38 through the five second cathode wirings (second cathode wirings for boards M03 to M05) of the upstream basic light emitting module M03.

Figure 10:
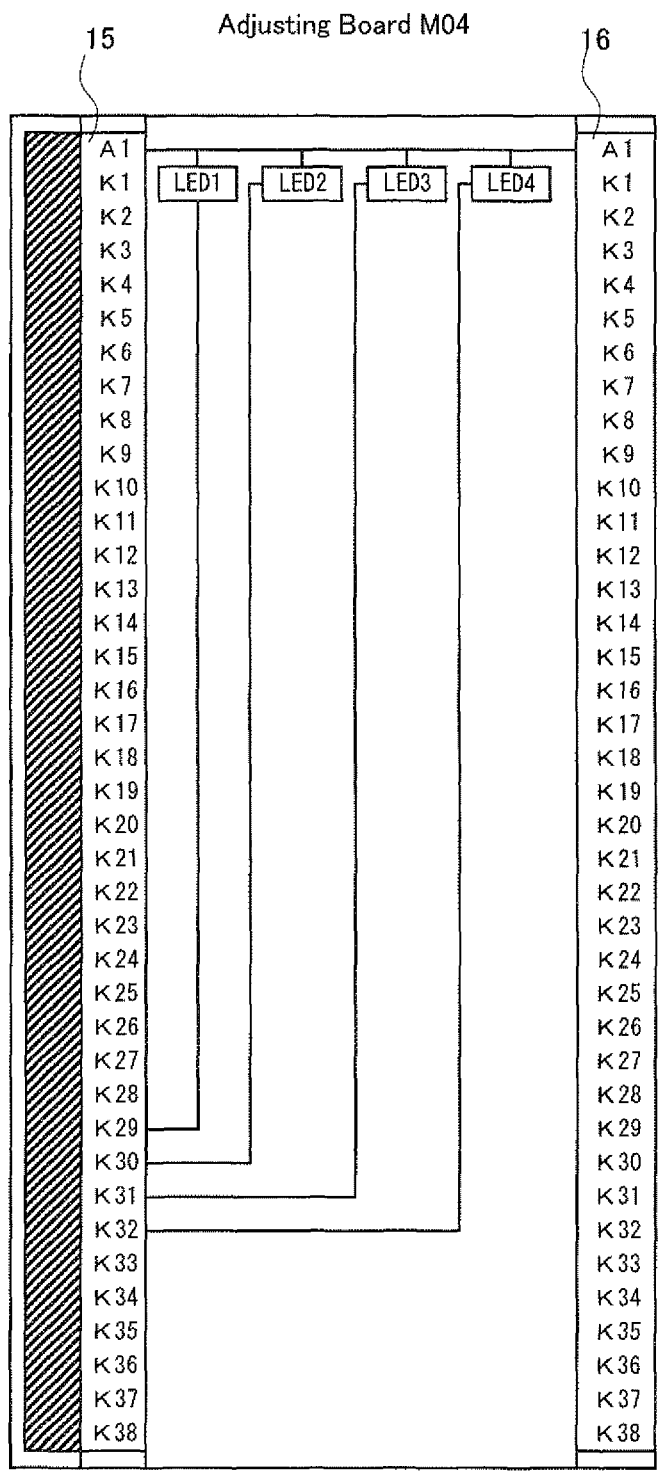
FIG. 10 shows a configuration example of a light emitting module according to the fourth embodiment of the present invention.

FIG. 10 is a circuit diagram showing wire connections between cathode control signal wirings (cathode wirings), anode control signal wirings (anode wirings), and light emitting bodies (LED packages) of the adjusting light emitting module M04. Each of the cathode control signal wiring groups of the light emitting module M04 has four first cathode wirings connected to the first cathode terminal groups K29 to K32 and the LED packages, respectively, and can be connected to any one of the upstream basic light emitting modules M01 to M03.

Figure 11:
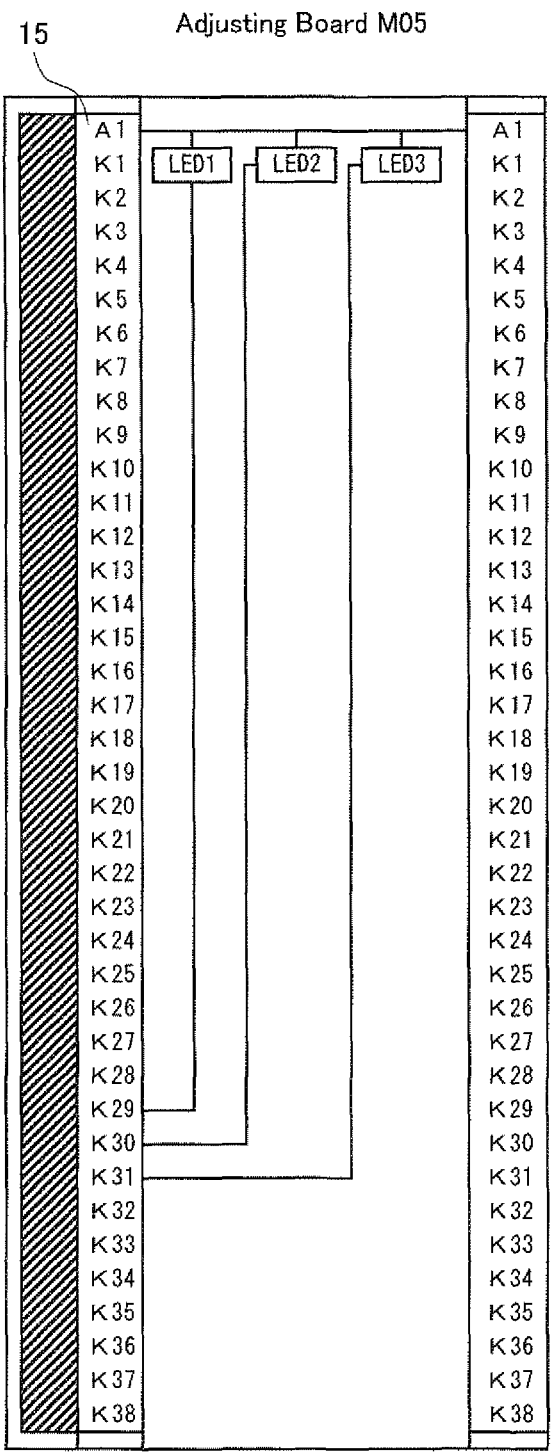
FIG. 11 shows a configuration example of a light emitting module according to the fourth embodiment of the present invention.

FIG. 11 is a circuit diagram showing wire connections between cathode control signal wirings (cathode wirings), anode control signal wirings (anode wirings), and light emitting bodies (LED packages) of the adjusting light emitting modules M05. Each of the cathode control signal wiring groups of the light emitting module M05 has three first cathode wirings connected to the first cathode terminal groups K29 to K31 and the LED packages, respectively, and can be connected to any one of the upstream basic light emitting modules M01 to M03.

As rules applied when the light emitting modules M01 to M05 are connected to each other, it is assumed that the number of basic light emitting modules of the same type is up to two and that the basic light emitting modules of different types are connected to each other in the order of M01, M02, and M03 from the side near the LED driver board, for example, M01-M01-M02-M02-M03, M01-M03-M03, or M02-M02-M03. With respect to the adjusting light emitting modules, only one of the modules M04 and M05 is necessarily connected to a position farthest away from the LED driver board.

On the basis of the above mutual connection rules, the plurality of light emitting modules M01 to M05 of five types are combined and connected to each other to configure a light emitting module unit. In this manner, a backlight system for liquid crystal display apparatuses having screen sizes of 13 to 80 inches can be structured. In the backlight systems for the liquid crystal display apparatuses, vertical and horizontal dimensions of screens having screen sizes of 13 inches to 80 inches, the number of necessary light emitting modules M01 to M05 to be used, and the number of necessary light emitting module units (the number of rows) are shown in FIG. 12. In FIG. 12, as the grounds for number of light emitting modules to be used, distances between LED packages arranged from one end to the opposite end in the vertical and horizontal directions of the screen are also described. The distances between the LED packages and the number of light emitting module units are calculated on the basis of intervals (50 mm) between the LED packages not to exceed a screen size, for example, can be calculated on the basis of the description in paragraph 0012 in Patent Document 2.

Figure 13:
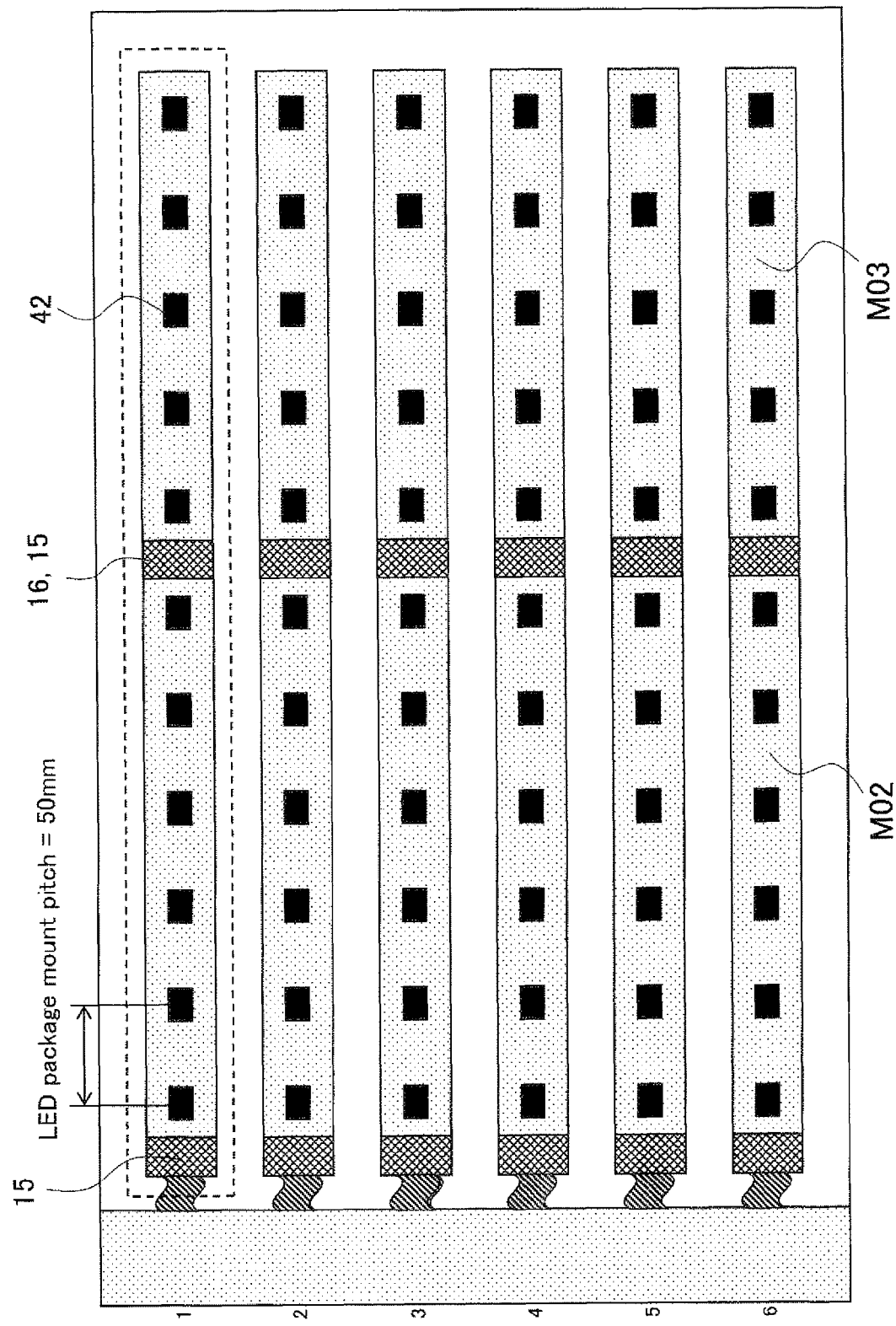
FIG. 13 is a configuration diagram of a backlight board according to the present invention when a screen size is 26 inches.
Figure 14:
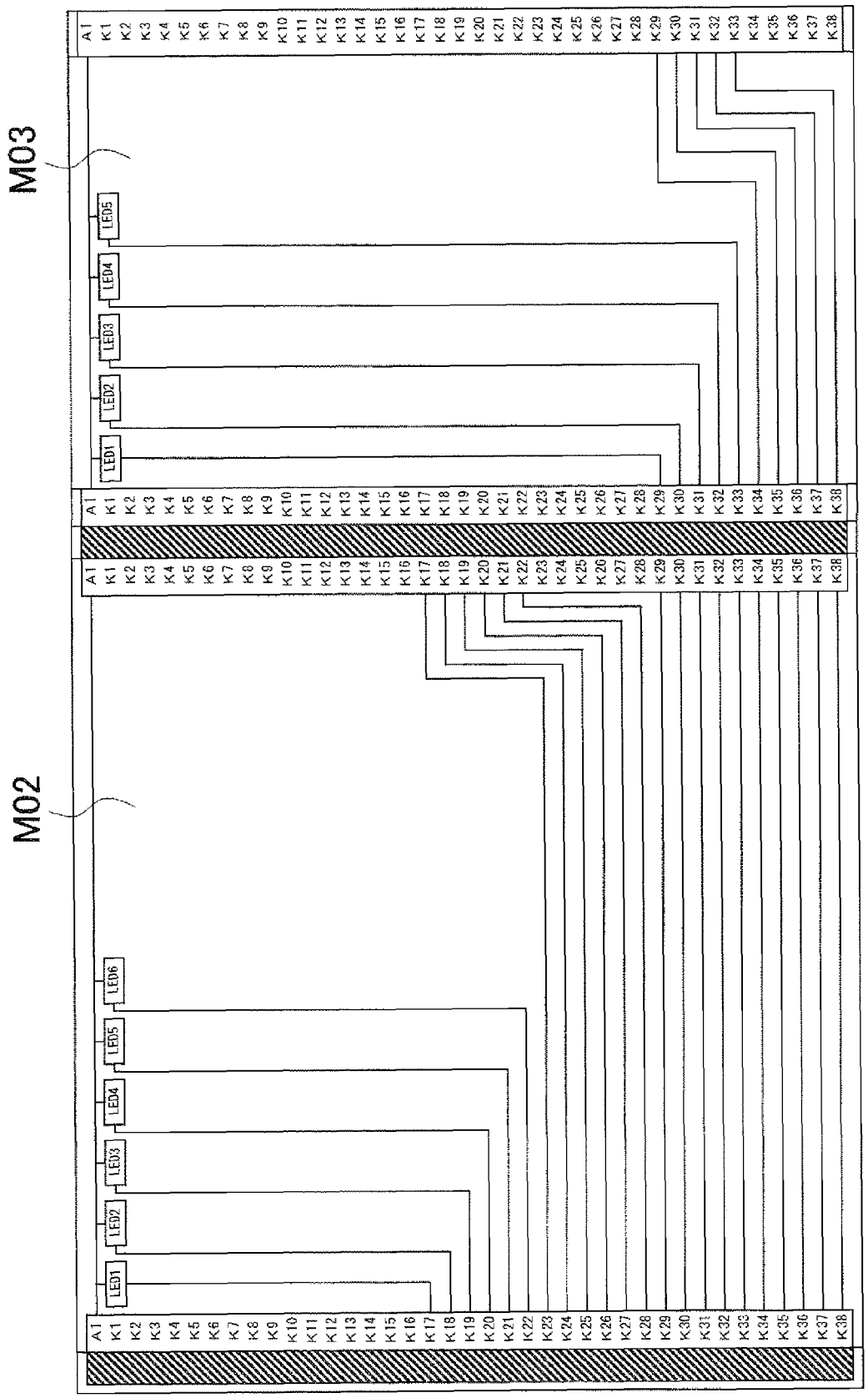
FIG. 14 is a configuration diagram of a light emitting module unit according to the present invention when a screen size is 26 inches.
Figure 15:
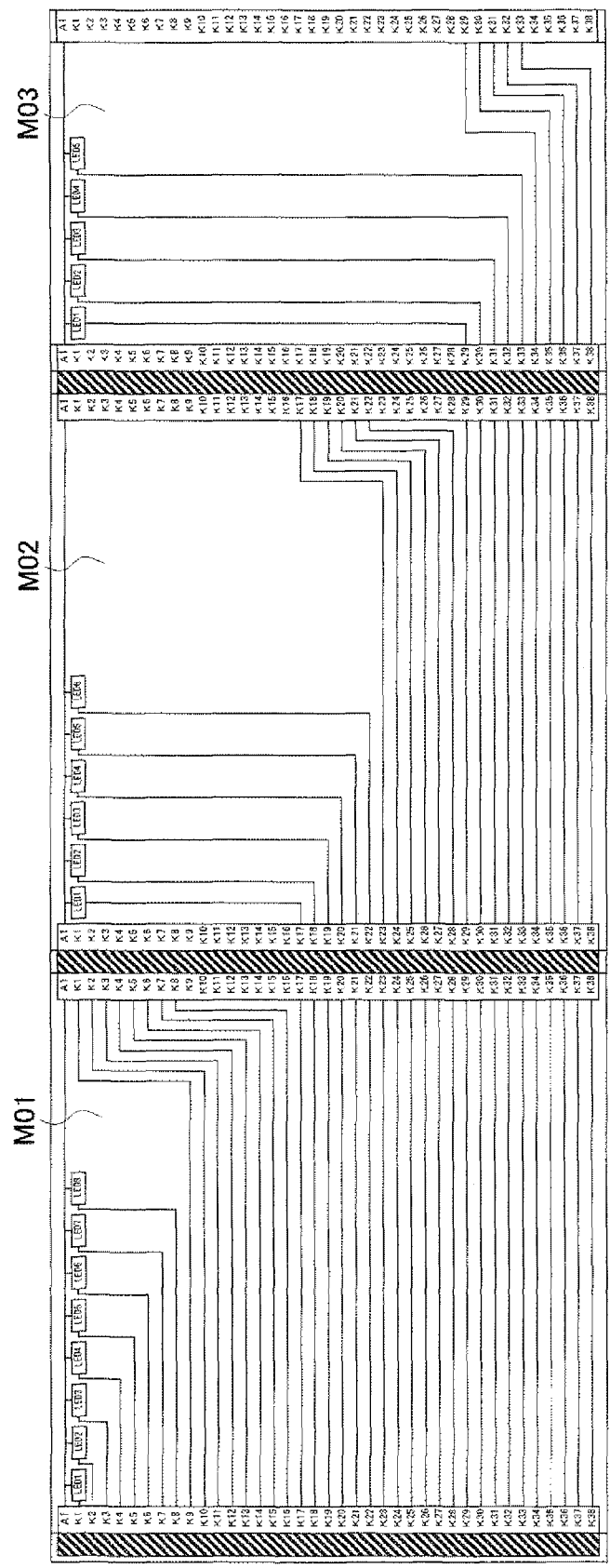
FIG. 15 is a configuration diagram of a light emitting module unit according to the present invention when a screen size is 42 inches.
Figure 16:
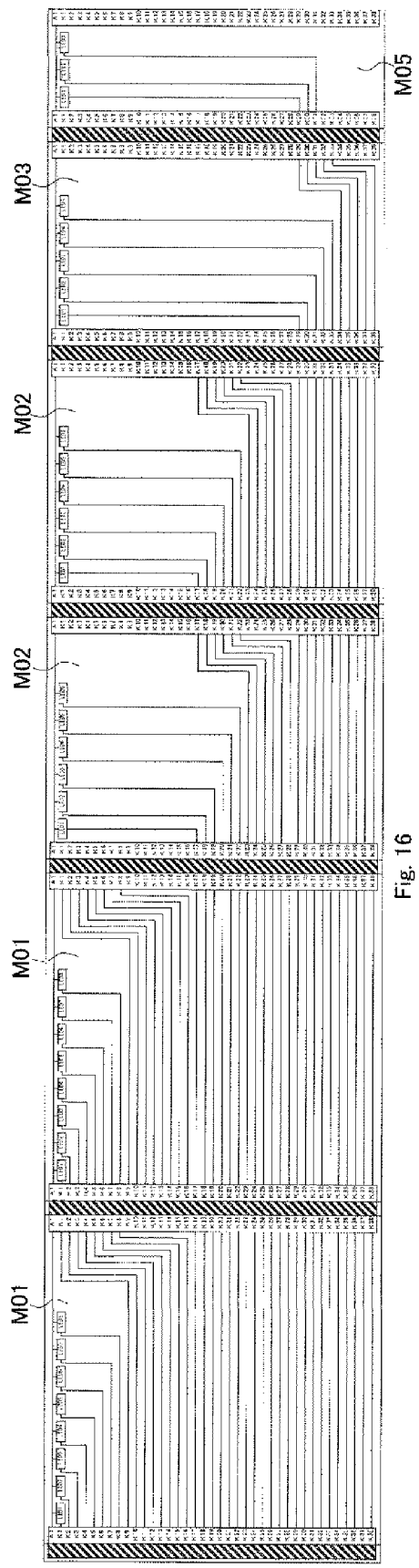
FIG. 16 is a configuration diagram of a light emitting module unit according to the present invention when a screen size is 80 inches.

On the basis of the number of light emitting modules to be used described in FIG. 12, according to the mutual connection rules, the light emitting module unit is configured to make it possible to configure a backlight system for a liquid crystal display apparatus. FIG. 13 shows a configuration of a backlight board when a screen size is 26 inches, FIGS. 14 to 16 show configurations of light emitting module units when screen sizes are 26 inches, 42 inches, and 80 inches, respectively, by using the circuit diagrams of the light emitting modules M01 to M05 shown in FIGS. 7 to 11 and used in combination.

A light crystal display apparatus can be provided by using the backlight system according to the embodiment in place of the backlight system described in the first embodiment. In the backlight system according to the embodiment, the LED packages on the light emitting module unit can be independently driven and controlled. For this reason, the backlight system is suitable for ON/OFF control of a backlight system of a local dimming scheme that divides a screen into a plurality of display areas and controls a luminance of a backlight in units of display areas. However, a control scheme that lights the whole area of a backlight may be employed without using the local dimming scheme.

Fifth Embodiment

The light emitting modules M01 to M05, as in the third embodiments, can be also configured to make it possible to supply anode control signals through a plurality of anode control signal wirings. More specifically, a description will be given below of an example in which three anode control signal wirings are prepared to configure a light emitting module unit 5 that can be applied to liquid crystal display apparatuses having screen sizes of 13 to 80 inches.

FIGS. 17 to 21 are circuit diagrams showing wire connections between cathode control signal wirings (cathode wirings), anode control signal wirings (anode wirings), and light emitting bodies (LED packages) with respect to basic light emitting modules M01' to M03' of three types and adjusting light emitting modules M04' and M05' of two types that are used in combination in the light emitting module unit 5. The light emitting modules M01' to M05' have the anode terminals A1 to A3 and the cathode terminals K01 to K38 in the first connector 15 and the second connector 16. Eight LED packages, six LED packages, and five LED packages are mounted on the basic light emitting modules M01', the basic light emitting modules M02', and the basic light emitting modules M03', respectively. Four LED packages and three LED packages are mounted on the adjusting light emitting module M04' and the adjusting light emitting module M05', respectively.

Figure 17:
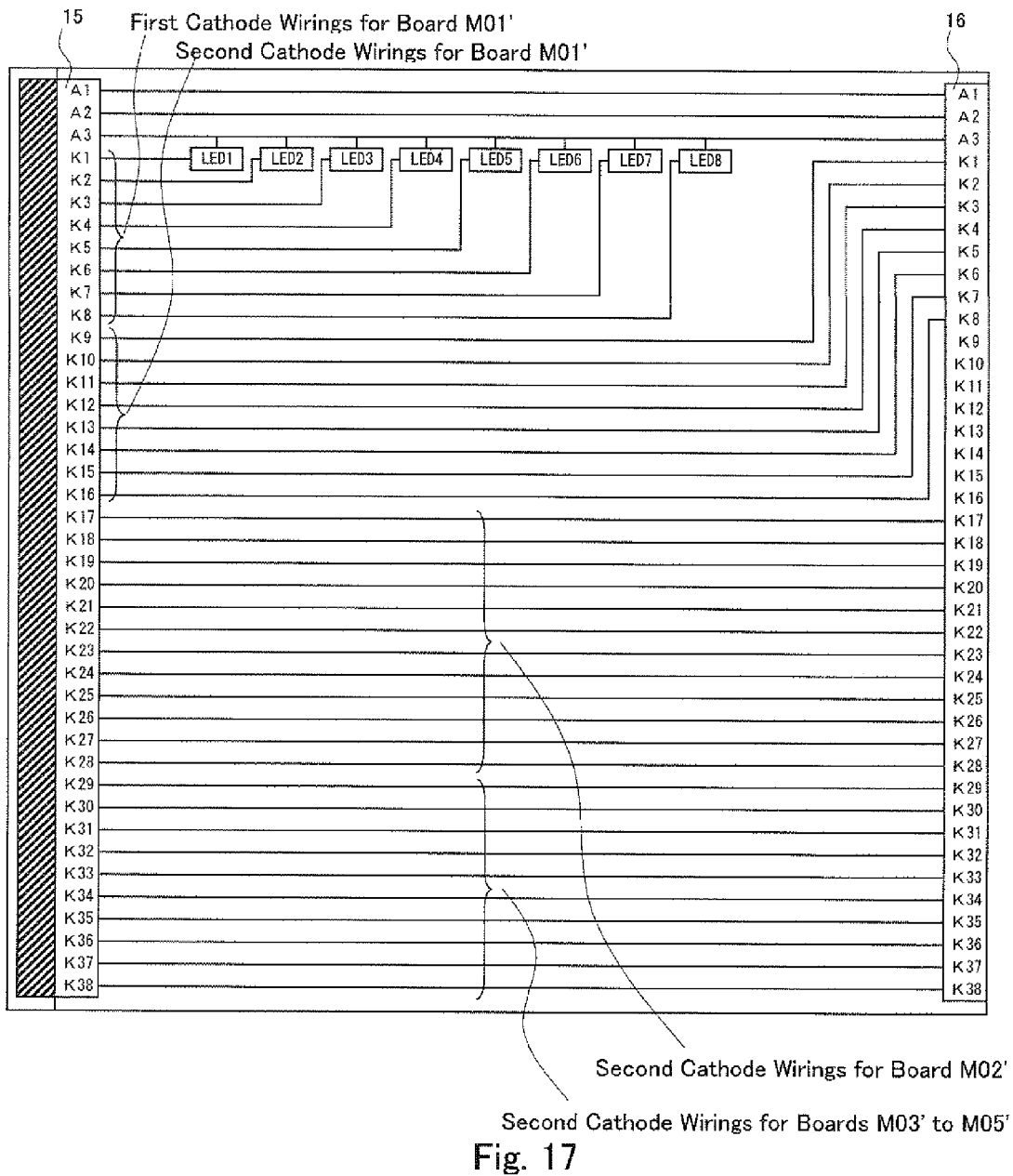
FIG. 17 shows a configuration example of a light emitting module according to a fifth embodiment of the present invention.

FIG. 17 is a circuit diagram showing wire connections between cathode control signal wirings (cathode wirings), the anode control signal wirings (anode wirings), and light emitting bodies (LED packages) of the basic light emitting module M01'. The anode control signal wiring group of the light emitting module M01' includes a common first anode wiring one end of which is connected to the anode terminal A3 of the first connector 15 and the other end of which is branched to be connected to all the LED packages on the light emitting module and a second anode wiring that connects the first anode wiring and the anode terminal A3 of the second connector 16 to each other and is not directly connected to the LED packages. Furthermore, the anode control signal wiring group of the light emitting module M01' includes two inter-terminal second anode wirings one ends of which are connected to the anode terminals of the first connector, the other ends of which are connected to the anode terminals of the second connector, and that are not connected to the LED packages. The anode terminal groups A1 and A2 (first anode terminal groups) of the first connector to which the inter-terminal second anode wirings are connected and the anode terminal groups A1 and A2 (second anode terminal groups) of the second connector to which the inter-terminal second anode wirings are connected are physically located at the same positions.

Figure 18:
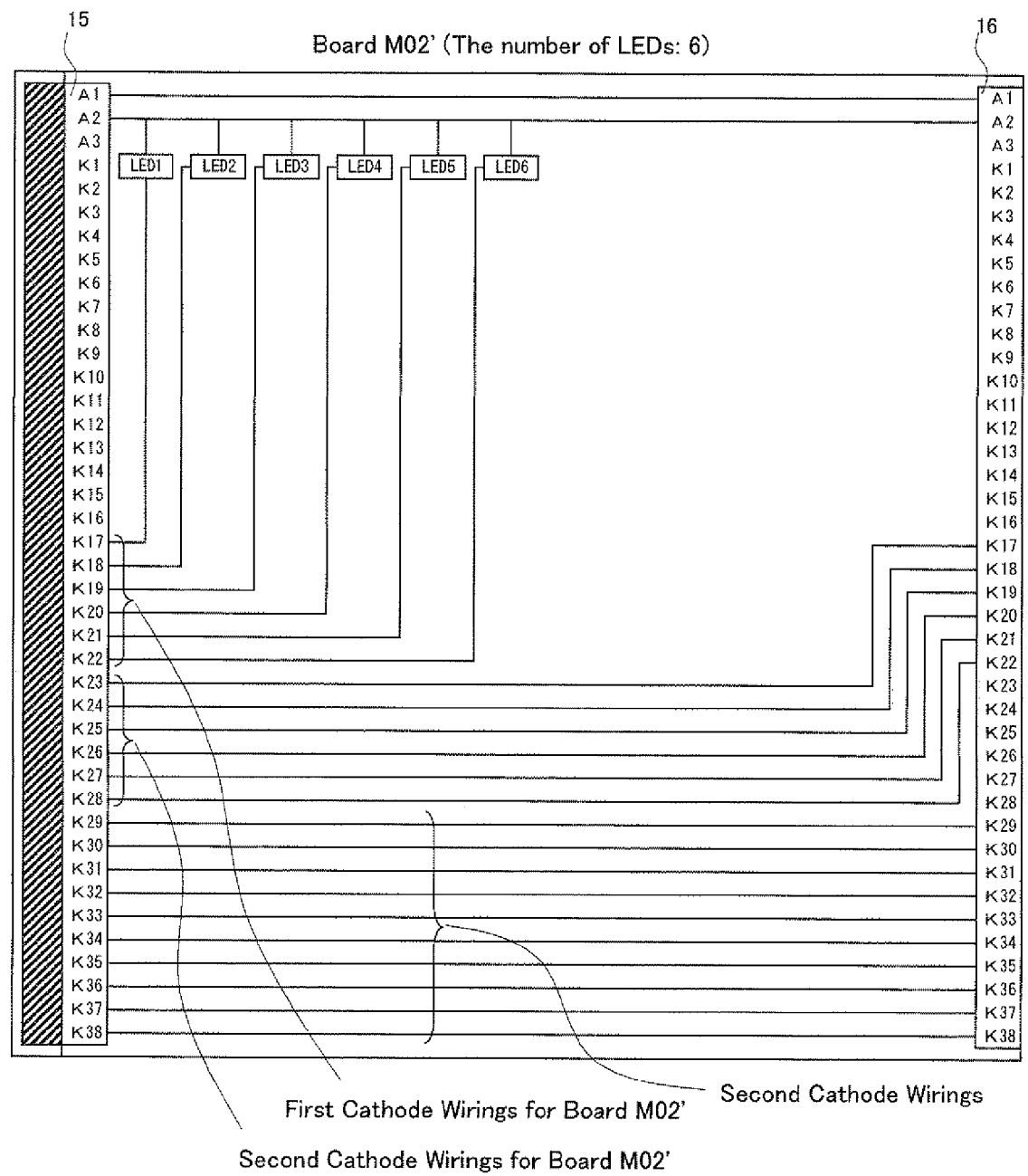
FIG. 18 shows a configuration example of a light emitting module according to the fifth embodiment of the present invention.

FIG. 18 is a circuit diagram showing wire connections between cathode control signal wirings (cathode wirings), anode control signal wirings (anode wirings), and light emitting bodies (LED packages) of the basic light emitting module M02'. The anode control signal wiring group of the light emitting module M02' includes a common first anode wiring one end of which is connected to the anode terminal A2 of the first connector 15 and the other end of which is branched to be connected to all the LED packages on the light emitting module and a second anode wiring that connects the first anode wiring and the anode terminal A2 of the second connector 16 to each other and is not directly connected to the LED packages. Furthermore, the anode control signal wiring group of the light emitting module M02' includes one inter-terminal second anode wiring one end of which is connected to the anode terminal of the first connector, the other end of which is connected to the anode terminal of the second connector, and that is not connected to the LED packages. The anode terminal group A1 (first anode terminal group) of the first connector to which the inter-terminal second anode wiring is connected and the anode terminal group A1 (second anode terminal group) of the second connector to which the inter-terminal second anode wiring is connected are physically located at the same position.

Figure 19:
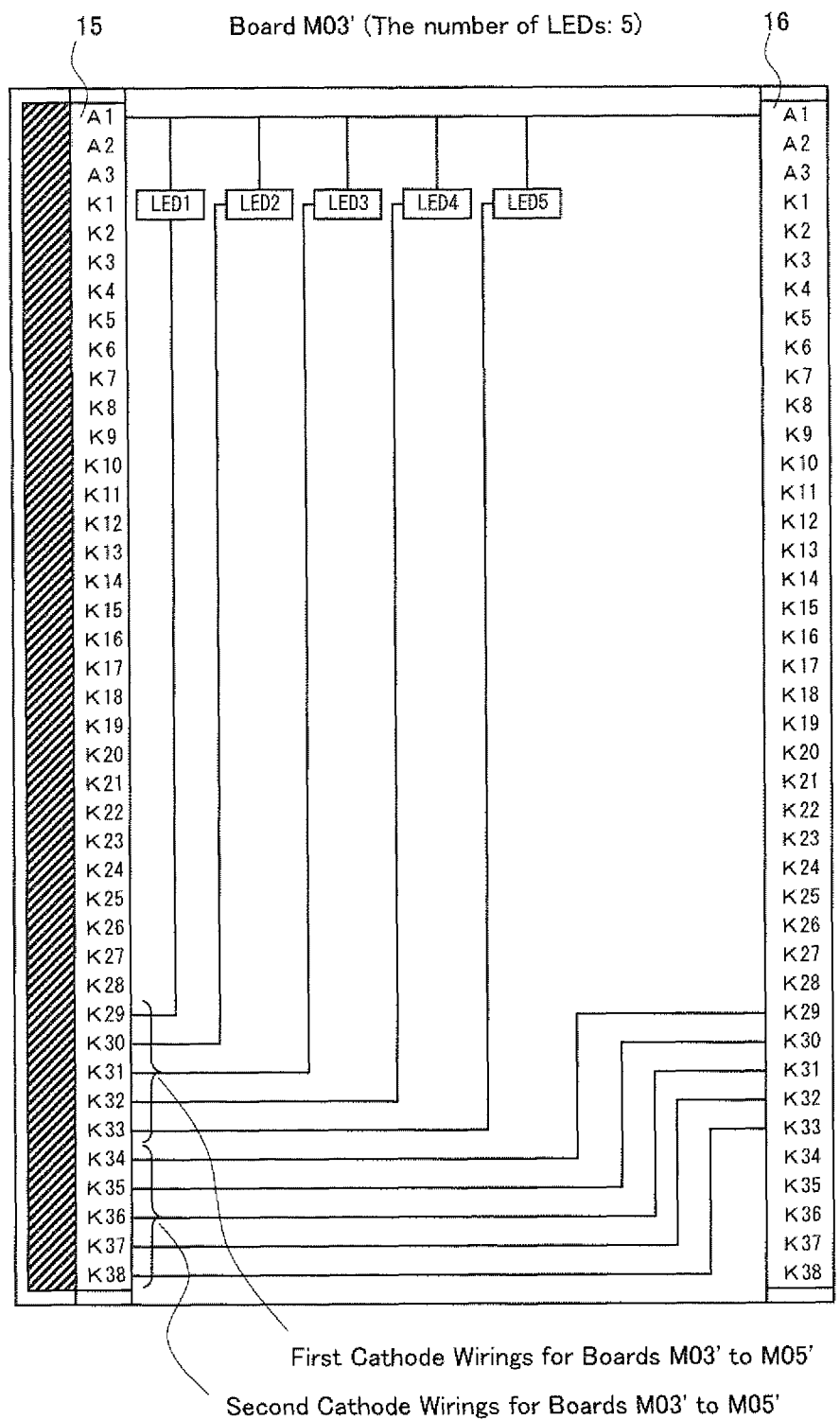
FIG. 19 is a configuration example of a light emitting module according to the fifth embodiment of the present invention.

FIG. 19 is a circuit diagram showing wire connections between cathode control signal wirings (cathode wirings), anode control signal wirings (anode wirings), and light emitting bodies (LED packages) of the basic light emitting module M03'. The anode control signal wiring group of the light emitting module M03' includes one common first anode wiring one end of which is connected to the anode terminal A1 of the first connector 15 and the other end of which is branched to be connected to all the LED packages on the light emitting module and a second anode wiring that connects the first anode wiring and the anode terminal A1 of the second connector 16 to each other.

Figure 20:
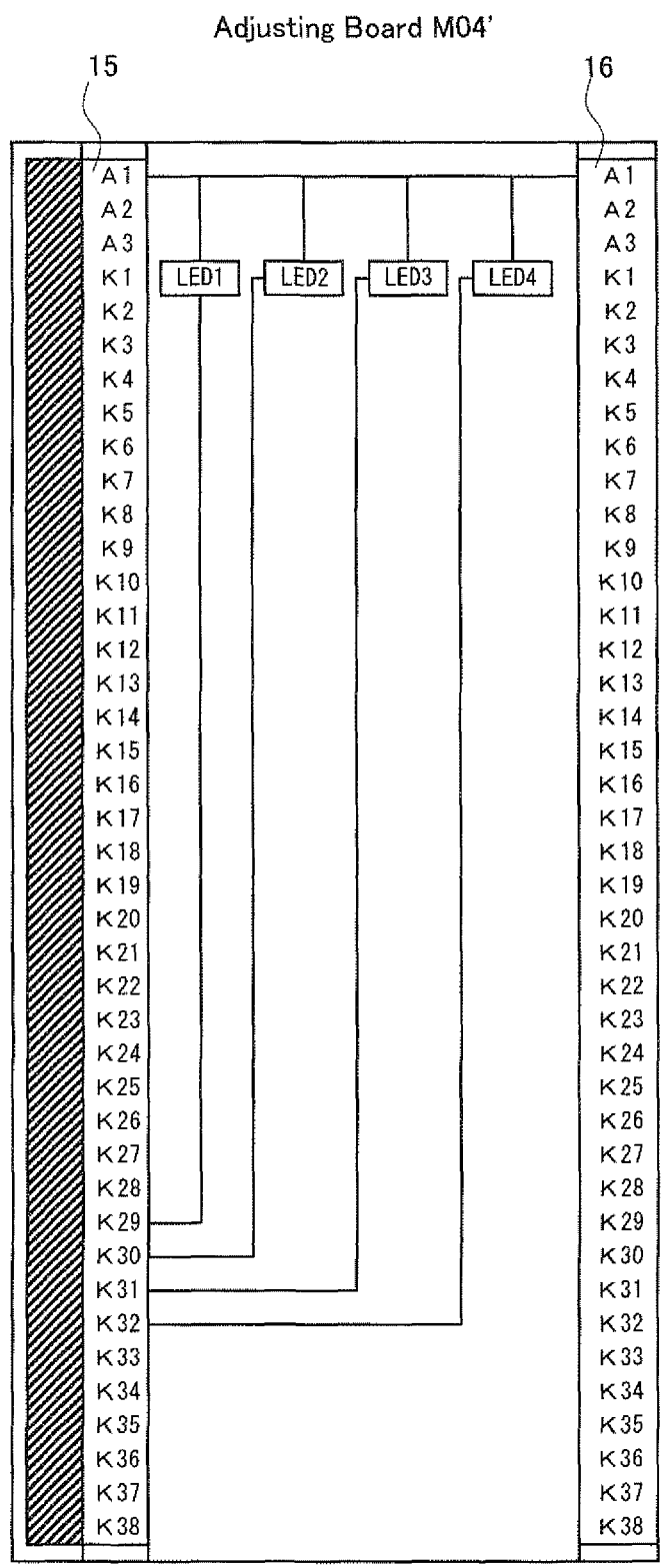
FIG. 20 shows a configuration example of a light emitting module according to the fifth embodiment of the present invention.
Figure 21:
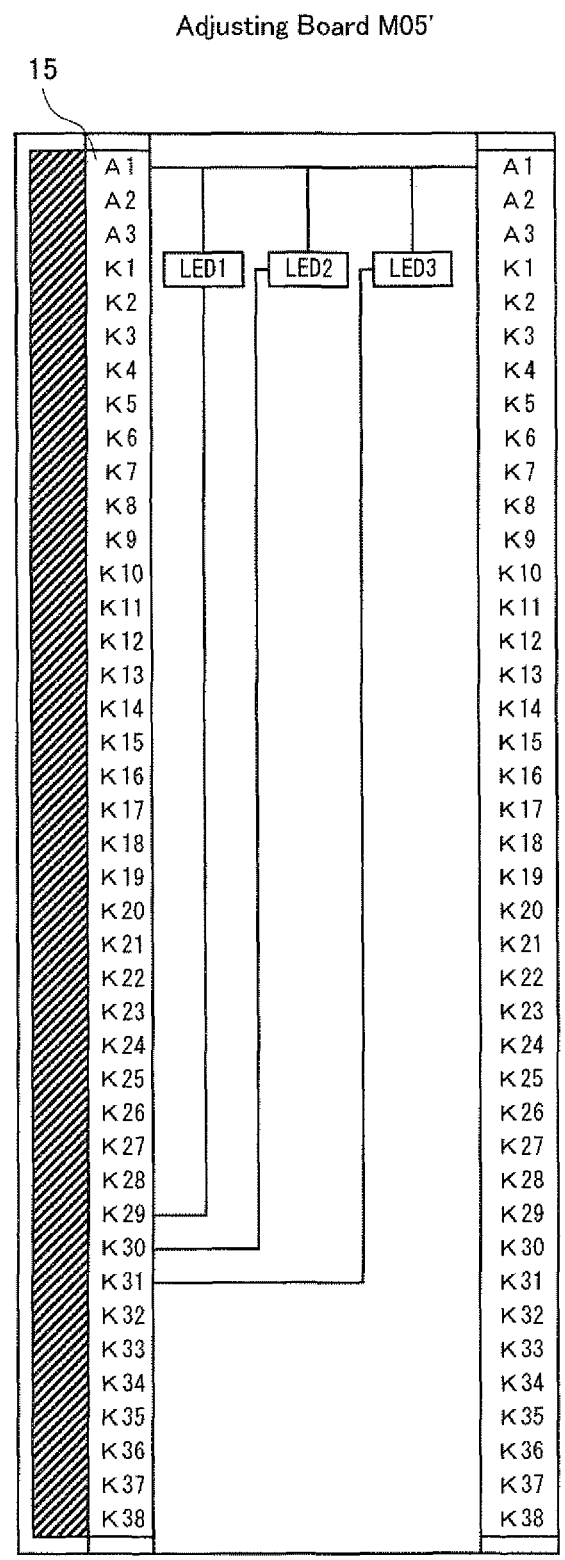
FIG. 21 is a configuration example of a light emitting module according to the fifth embodiment of the present invention.

FIG. 20 and FIG. 21 are circuit diagrams showing wire connections between cathode control signal wirings (cathode wirings), anode control signal wirings (anode wirings), and light emitting bodies (LED packages) of the adjusting light emitting modules M04' and M05', respectively. The anode control signal wiring groups of the light emitting modules M04' and M05' have a common first anode wiring one end of which is connected to the anode terminal A1 of the first connector 15 and the other end of which is branched to be connected to all the LED packages on the light emitting module.

In this manner, since the light emitting module M01', the light emitting module M02', and the light emitting modules M03' to M05' can independently receive the anode control signals from the anode terminal A3, the anode terminal A2, and the anode terminal A1, respectively to cope with a fluctuation of a forward drop voltage Vf required to operate an LED, an upper limit of a necessary anode supply voltage can be lowered.

Since a method of connecting cathode signal wirings, a method of mounting a light emitting LED package, and a method of configuring a light emitting module unit depending on a screen size in each of the light emitting modules M01' to M05' are the same as those in the fourth embodiment, a description thereof will be omitted.

The embodiments described above are examples of a preferred embodiment of the present invention. The embodiment of the present invention is not limited to the embodiments described above, various changes and modification can be made without departing from the spirit and scope of the present invention.

Other Embodiments

Other embodiments will be described below.

<1> In the embodiments described above, each of the light emitting modules is configured to have a common first anode wiring for a plurality of mounted LED packages. However, in order to make it possible to drive the LED packages independently, the light emitting module has an independent cathode wiring and an independent cathode terminal for each of the LED packages. The present invention is not limited to the above configuration, a common cathode wiring may be arranged for a plurality of LED packages, and the light emitting module may have an independent anode wiring for each of the LED packages. The roles of the cathode wiring and the anode wiring are merely replaced with each other.

<2> In the above embodiments, the light emitting body includes one LED package. However, the present invention is not limited to this configuration, and a plurality of LED packages may be configured as one light emitting body. In this case, not only LED packages that emit white light, but also LED packages that emit red, blue, and green light may be combined to each other.

<3> In the above embodiments, the intervals between the LED packages in the vertical and horizontal directions of the screen are set to be equal to each other. However, the intervals in the vertical and horizontal directions may be different from each other.

<4> In the above embodiments, the arrangements of the anode wirings, the cathode wirings, and the light emitting bodies in the light emitting module are not specially defined, and it is supposed that both the anode wirings and the cathode wirings are arranged on the same board surface as the board surface on which the light emitting bodies are formed. However, the present invention is not limited to the arrangement. When a board both the surfaces of which are implementable is used, any one of the cathode wiring and the anode wiring can be arranged on a rear surface of a board surface on which the light emitting body is formed. In particular, when a common anode wiring is arranged on the rear surface of the board, a broad anode wiring can be secured over the rear surface of the board, and the resistance of the anode wiring can be reduced. For this reason, heat generation caused when currents are caused to flow into all the light emitting bodies on the light emitting modules in the light emitting module unit through a common anode wiring can be reduced.

Figure 22A:
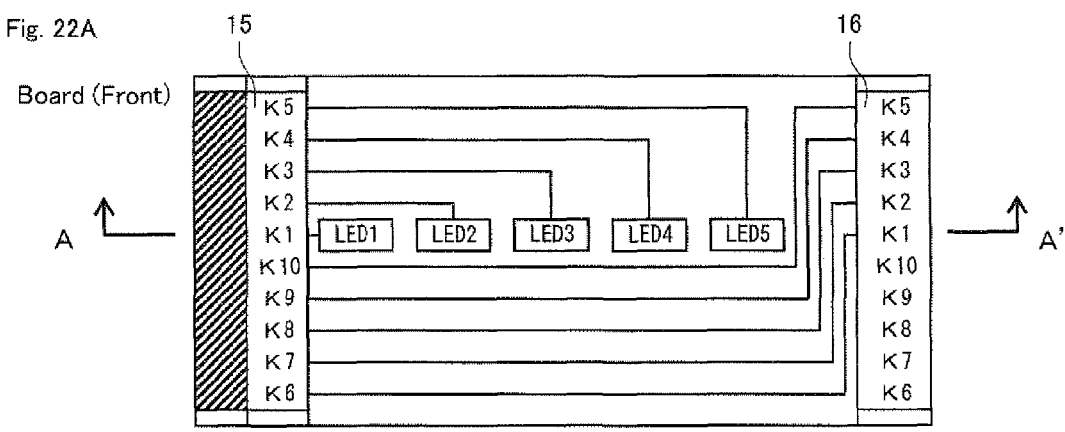
FIG. 22 shows a configuration example of a light emitting module according to another embodiment of the present invention.
Figure 22B:
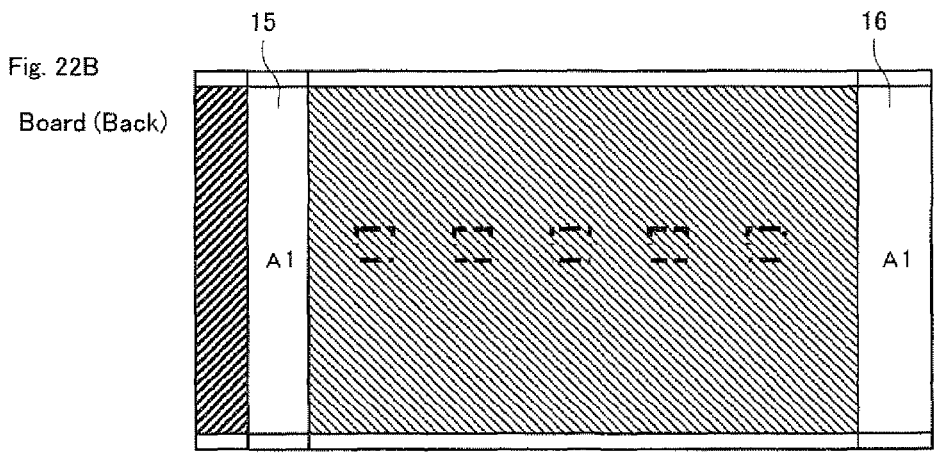
Figure 22C:
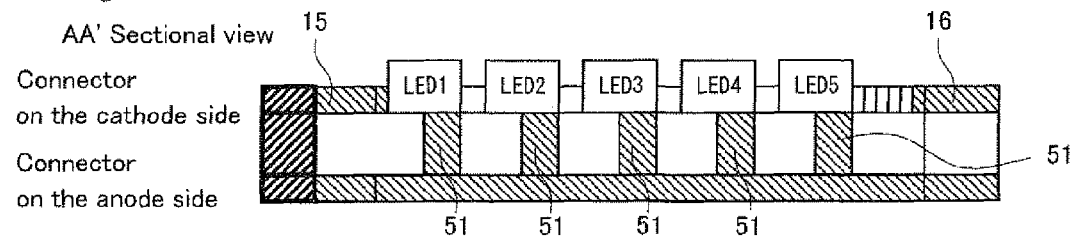

FIG. 22 shows an example of a wiring pattern of the light emitting module board having an anode wiring formed on the rear surface of the board. FIG. 22A shows a wiring pattern of the light emitting body (LED package) and the cathode wiring on the front surface of the light emitting module board, FIG. 22B shows a wiring pattern of an anode wiring on the rear surface, and FIG. 22C shows a sectional view of the board in an A-A' direction. The common anode wiring is formed on the entire rear surface of the light emitting module board, and the anode wiring and a land pattern (not shown) or the LED packages are connected to each other by a penetrating electrode 51. Since the anode wiring is arranged on the entire rear surface of the board to reduce the resistance of the anode wiring and to reduce heat generation, large currents can be supplied to the light emitting module and the light emitting module connected at the downstream side of the light emitting module.

The above configuration can be applied to not only a modular mount board as in the present invention but also a general light emitting module unit that is not made modular, and a backlight board.

<5> In the fourth and fifth embodiments, up to two basic light emitting modules of the same type can be connected. However, the present invention is not limited to the configuration, and three or more light emitting modules of the same type can be connected. For example, unlike the embodiments described above showing the example in which the cathode wirings are arranged for LED packages, respectively, and connected in parallel to each other to make it possible to independently drive a plurality of LED packages, a plurality of LED packages may be connected in series with each other. A basic light emitting module M06 shown in FIG. 23A has eight LED packages that are connected in series with each other by one cathode wiring and one anode wiring that is not connected to the LED packages. The cathode wiring is connected to the cathode terminals K1 of the first connector 15 and the second connector 16 at both the ends of the board, respectively, and the anode wiring is connected to the anode terminals A1 of the first connector 15 and the second connector 16 at both the ends of the board, respectively. When the light emitting modules of the same type are connected at the downstream side, the anode and cathode terminals of the first connector 15 of the downstream light emitting module can be connected to an LED driver board (not shown) or the anode and cathode terminals of the second connector of the upstream light emitting module, respectively, and the anode and cathode terminals of the second connector 16 can be connected to the anode and cathode terminals of the first connector of the downstream light emitting module, respectively. Similarly, FIGS. 23B and 23C show configuration examples of the basic light emitting modules M07 and M08 the numbers of LED packages of which are different from each other, respectively. Six LED packages and five LED packages are mounted on the basic light emitting modules M07 and the basic light emitting modules M08, respectively.

When the basic light emitting modules are arranged at terminal positions connected to a position farthest away from an LED driver board (not shown), a switch (SW) 17 to electrically connect the anode wiring and the LED package to each other is arranged to drive the LED package. With the mechanism, when the basic light emitting modules M06 to M08 are connected to each other, all the LED packages are connected in series with each other, and control signals can be supplied to the LED packages of all the basic light emitting modules through the cathode wiring and the anode wiring of the basic light emitting modules directly connected to the LED driver board.

FIG. 24A shows a configuration example of an adjusting light emitting module M09 in which four LED packages are mounted, and FIG. 24B shows a configuration example of an adjusting light emitting module M10 in which three LED packages are mounted. In the examples, the adjusting light emitting modules M09 and M10 are designed on the assumption that the adjusting light emitting modules M09 and M10 are connected to terminal positions farthest away from an LED driver board (not shown), the anode wiring and the LED packages are connected to each other from the beginning without a switch. The second connector is also omitted.

When the basic light emitting modules M06 to M08 and the adjusting light emitting modules M09 and M10 are connected to each other, backlight systems corresponding to a lineup of screen sizes of 13 to 80 inches described in the fourth embodiment can be realized with a configuration different from the configuration shown in FIG. 12. For example, when a screen size is 52 inches, three basic light emitting modules M06 in each of which eight LED packages are mounted may be connected to each other. Alternatively, when a screen size is 40 inches, three basic light emitting modules M07 in each of which six LED packages are mounted may be connected to each other.

FIG. 25 shows a list of configurations of light emitting module unit of each screen size corresponding to FIG. 12 according to the fourth embodiment. As is apparent from the drawing, the basic light emitting module M08 and the adjusting light emitting module M09 need not be used, and the number of types of light emitting modules can be reduced in comparison with the fourth embodiment.

A liquid crystal display apparatus can be provided by using the backlight system according to the embodiment in place of the backlight system described in the fourth embodiment. Since the backlight system according to the embodiment employs a method of controlling an LED package different from that of the backlight system according to the fourth embodiment, a control circuit needs to be changed.

More specifically, in the light emitting module unit included in the backlight system according to the embodiment, all the LED packages on the light emitting module unit are connected in series with each other such that the LED packages on one light emitting module unit cannot be independently driven. Therefore, when the backlight system is used as a backlight system for a liquid crystal display apparatus, it is not suitable for ON/OFF control of a backlight system using a local dimming scheme in which a screen is divided into a plurality of display areas to control a luminance of a backlight in units of the display areas, but is suitable for a control scheme for a backlight system that uses a conventional CCFL as a light source and in which an entire surface is lit to perform display while adjusting transmittances of pixels of a liquid crystal panel. The control scheme that lights an entire surface advantageously has a control circuit that is simpler than that in the local dimming scheme.

INDUSTRIAL APPLICABILITY

The present invention can be used in the backlight apparatus for a transmission display apparatus and, in particular, a backlight apparatus that has a common module board to screen sizes to reduce the number of types of constituent elements on a mount board.

The invention claimed is:

1. A light emitting module, comprising:
an anode control signal wiring group formed on a board,
a cathode control signal wiring group formed on the board,
a plurality of light emitting bodies formed on the board and arranged in a longitudinal direction of the board,
a first connector on one end of the board and a second connector on the other end of the board, each connector being configured by a plurality of cathode terminals and at least one anode terminal, wherein
the light emitting module, such that in each connection between two adjacent light emitting modules, the second connector of an upstream light emitting module is connected with the first connector of a downstream light emitting module, thereby being configured to be capable of a multi-level connection of at least three of the light emitting modules;
the anode control signal wiring group includes a first anode wiring and at least one second anode wiring, one end of the first anode wiring being connected to one of the anode terminal of the first connector, and the other end of the first anode wiring being connected to one end of each of the light emitting bodies on the board, one end of the at least one second anode wiring being connected to the first anode wiring or another anode terminal of the first connector, and the other end of the at least one second anode wiring being connected to one of the at least one anode terminal of the second connector;
the cathode control signal wiring group includes a first cathode wiring group including a plurality of first cathode wirings and a second cathode wiring group including a plurality of second cathode wirings;
one end of each of the first cathode wirings is connected to one of the cathode terminals of the first connector and the other end of each of the first cathode wirings is connected to the other end of one of the light emitting bodies on the board;
one end of each of the second cathode wirings is connected to one of the cathode terminals of the first connector, the other end of each of the second cathode wirings is connected to one of the cathode terminals of the second connector, and the second cathode wirings are not connected to the light emitting bodies on the board;
the cathode terminals in the first connector to which the first cathode wirings of the first cathode wiring group are connected configure a first cathode terminal group;
the cathode terminals in the first connector to which the second cathode wirings of the second cathode wiring group are connected configure a second cathode terminal group;
a third cathode terminal group, defined by some of the cathode terminals of the second connector to which the other end of each of the second cathode wirings is connected, is physically located at the same position as that of the first cathode terminal group of the first connector of another light emitting module having a same or different number of light emitting bodies; and
the physical position of the third cathode terminal group overlaps that of the first cathode terminal group,
wherein the other end of each of some of the second cathode wirings is not connected to the cathode terminals of the third cathode terminal group, while the other end of each of a rest of the other second cathode wirings is connected to corresponding one of the cathode terminals in the second connector of the third cathode terminal group, and the second cathode wirings that are not connected to the cathode terminals of the third cathode terminal group defines a third cathode wiring group.

2. The light emitting module according to claim 1, wherein
the cathode terminals in the first connector to which the second cathode wirings of the third cathode wiring group are connected configure a fourth cathode terminal group,
the cathode terminals in the second connector to which the second cathode wirings of the third cathode wiring group are connected configure a fifth cathode terminal group, and
the fourth cathode terminal group in the first connector and the fifth cathode terminal group in the second connector are physically located at the same position.

3. The light emitting module according to claim 1, wherein the number of second cathode wirings connected to the cathode terminals of the third cathode terminal group is different from the number of first cathode wirings.

4. The light emitting module according to claim 1, further comprising:
a plurality of anode terminals in each of the first connector and the second connector; and
an inter-terminal second anode wiring that is one of said second anode wirings one end of which is connected to one of the anode terminals in the first connector, the other end of which is connected to one of the anode terminals in the second connector, and that is not connected to the light emitting bodies on the board.

5. The light emitting module according to claim 4, wherein the anode terminal in the second connector to which said inter-terminal second anode wiring is connected is physically located at the same position as the anode terminal in the first connector to which the first anode wiring of another light emitting module is connected.

6. The light emitting module according to claim 4, wherein a first anode terminal group including the anode terminals in the first connector to which said inter-terminal second anode wiring is connected is physically located at the same position as the second anode terminal group including the anode terminals in the second connector to which the inter-terminal second anode wiring is connected.

7. The light emitting module according to claim 1, wherein the light emitting body is an LED.

8. A light emitting module unit comprising: a plurality of light emitting modules each according to claim 1, wherein the light emitting modules are coupled to each other by connecting the second connector of the upstream module and the first connector of the downstream module to each other.

9. The light emitting module unit according to claim 8, wherein two light emitting modules having a different number of the first cathode wirings are coupled by connecting the second connector of the upstream module and the first connector of the downstream module to each other.

10. The light emitting module unit according to claim 9, further comprising two light emitting modules having an equal number of the first cathode wirings are coupled by connecting the second connector of the upstream module and the first connector of the downstream module to each other.

11. A light emitting module unit, comprising:
   a plurality of light emitting modules, each according to claim 1,
   the light emitting modules each having a number of first cathode wirings are selected under a condition that in the selected light emitting modules a plurality of light emitting modules are allowed to have the same number of first cathode wirings,
   for each connection between adjacent selected light emitting modules, the second connector of the upstream module and the first connector of the downstream module are connected to each other to couple two adjacent light emitting modules to each other, so that all the light emitting bodies in the selected light emitting modules, the at least one cathode terminal of the first connector in the light emitting module of the most upstream module, and the at least one anode terminal of the first connector in the light emitting module of the most upstream module are electrically connected.

12. A backlight apparatus, wherein a plurality of light emitting module units each according to claim 8 are arranged in a direction orthogonal to a coupling direction of the light emitting modules.

13. A transmission display apparatus comprising
   a transmission display panel that changes a transmittance of light for each display region to use transmitted light in display; and
   the backlight apparatus according to claim 12, wherein light is radiated from the backlight apparatus on a backside of the transmission display panel to perform display.

14. The light emitting module according to claim 1, wherein
   the physical position of a cathode terminal group, defined by all of the cathode terminals of the second connector to which other end of the second cathode wirings are connected, overlaps that of the first cathode terminal group.

* * * * *